US012406195B2

(12) United States Patent
Renders et al.

(10) Patent No.: US 12,406,195 B2
(45) Date of Patent: Sep. 2, 2025

(54) ADAPTIVE POINTWISE-PAIRWISE LEARNING TO RANK

(71) Applicant: Naver Corporation, Seongnam-si (KR)

(72) Inventors: Jean-Michel Renders, Quaix en Chartreuse (FR); Yagmur Gizem Cinar, Grenoble (FR)

(73) Assignee: Naver Corporation (KR)

( * ) Notice: Subject to any disclaimer, the term of this patent is extended or adjusted under 35 U.S.C. 154(b) by 1193 days.

(21) Appl. No.: 17/215,323

(22) Filed: Mar. 29, 2021

(65) Prior Publication Data

US 2021/0383254 A1 Dec. 9, 2021

(30) Foreign Application Priority Data

Jun. 3, 2020 (EP) .................................... 20305582

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,626,654 B2* | 4/2017 | Tang | ...................... | G06N 20/00 |
| 9,811,765 B2* | 11/2017 | Wang | ................ | G06F 18/24143 |
| 2009/0292685 A1 | 11/2009 | Liu et al. | | |
| 2012/0150855 A1* | 6/2012 | Chang | .................... | G06F 16/951 |
| | | | | 707/728 |
| 2013/0080426 A1 | 3/2013 | Chen et al. | | |
| 2017/0330068 A1 | 11/2017 | Yu et al. | | |
| 2018/0108124 A1 | 4/2018 | Guo et al. | | |
| 2019/0251446 A1* | 8/2019 | Fang | ...................... | G06N 3/084 |
| 2019/0294731 A1* | 9/2019 | Gao | ........................ | G06N 20/00 |
| 2020/0293902 A1* | 9/2020 | Li | ........................... | G06N 3/088 |
| 2021/0319033 A1* | 10/2021 | Zhang | ................... | G06F 16/953 |

(Continued)

OTHER PUBLICATIONS

PPP: Joint Pointwise and Pairwise Image Label Prediction; Wang et al. (Year: 2016).*

(Continued)

*Primary Examiner* — Mandrita Brahmachari

(74) *Attorney, Agent, or Firm* — Michael J. Nickerson

(57) ABSTRACT

A method of ranking items for a given entity uses sets of triplets <u, i, j>, each set of triplets including an entity u and a pair of items i and j with a known relative relevance for entity u, to train a learnable scoring function $f$ and to learn optimized values of a first set $\theta$ of learnable parameters. The training includes optimizing a loss function depending on $\theta$, on a second set of learnable parameters $\theta_g$, and on a probability of having the item i preferred to the item j by the entity u. The probability defines a continuum between pointwise and pairwise ranking of items through a learnable mixing function depending on $\theta_g$. After training, the trained learnable scoring function $f$ is applied to all input pairs <u', i'> to rank all items i' for an entity u'.

31 Claims, 5 Drawing Sheets

(56) References Cited

U.S. PATENT DOCUMENTS

2022/0180401 A1* 6/2022 Roy Chowdhury ............... G06Q 30/0256

OTHER PUBLICATIONS

Cinar, Yagmur Gizem, and Renders, Jean-Michel. "Adaptive Pointwise-Pairwise Learning-to-Rank for Content-based Personalized Recommendation," RecSys '20: Fourteenth ACM Conference on Recommender Systems, Sep. 2020, pp. 414-419. https://doi.org/10.1145/3383313.3412229 2020.

Ah-Pine, J M, C M Cifarelli, S M Clinchant, G M Csurka, and J M Renders. 'XRCE's Participation to ImageCLEF 2008'. In 9th Workshop of the Cross-Language Evaluation Forum (CLEF 2008). Aarhus, Denmark, 2008. https://hal.archives-ouvertes.fr/hal-01504444. 2008.

Ah-Pine, Julien, Gabriela Csurka, and Stephane Clinchant. 'Unsupervised Visual and Textual Information Fusion in CBMIR Using Graph-Based Methods'. ACM Transactions on Information Systems 33, No. 2 (Feb. 26, 2015): 1-31. https://doi.org/10.1145/2699668. Feb. 26, 2015.

Ai, Qingyao, Keping Bi, Jiafeng Guo, and W. Bruce Croft. 'Learning a Deep Listwise Context Model for Ranking Refinement'. The 41st International ACM SIGIR Conference on Research & Development in Information Retrieval, Jun. 27, 2018, 135-44. https://doi.org/10.1145/3209978.3209985. Jun. 27, 2018.

Andrew, Galen, Raman Arora, Jeff Bilmes, and Karen Livescu. 'Deep Canonical Correlation Analysis', n.d., 9. 2019.

Bruch, Sebastian, Masrour Zoghi, Michael Bendersky, and Marc Najork. 'Revisiting Approximate Metric Optimization in the Age of Deep Neural Networks'. In Proceedings of the 42nd International ACM SIGIR Conference on Research and Development in Information Retrieval, 1241-44. Paris France: ACM, 2019. https://doi.org/10.1145/3331184.3331347. 2019.

Burges, Christopher J C. 'From RankNet to LambdaRank to LambdaMART: An Overview', n.d., 19. 2019.

Carvalho, Micael, Rémi Cadène, David Picard, Laure Soulier, Nicolas Thome, and Matthieu Cord. 'Cross-Modal Retrieval in the Cooking Context: Learning Semantic Text-Image Embeddings'. ArXiv:1804.11146 [Cs], Apr. 30, 2018. http://arxiv.org/abs/1804.11146. Apr. 30, 2018.

Chen, Kan, Trung Bui, Fang Chen, Zhaowen Wang, and Ram Nevatia. 'AMC: Attention Guided Multi-Modal Correlation Learning for Image Search'. ArXiv:1704.00763 [Cs], Apr. 3, 2017. http://arxiv.org/abs/1704.00763. Apr. 3, 2017.

Clinchant, Stephane, Jean-Michel Renders, and Gabriela Csurka. 'Trans-Media Pseudo-Relevance Feedback Methods in Multimedia Retrieval'. In Advances in Multilingual and Multimodal Information Retrieval, edited by Carol Peters, Valentin Jijkoun, Thomas Mandl, Henning Müller, Douglas W. Oard, Anselmo Peñas, Vivien Petras, and Diana Santos, 5152:569-76. Lecture Notes in Computer Science. Berlin, Heidelberg: Springer Berlin Heidelberg, 2008. https://doi.org/10.1007/978-3-540-85760-0_71. 2008.

Csurka, Gabriela, Julien Ah-Pine, and Stéphane Clinchant. 'Unsupervised Visual and Textual Information Fusion in Multimedia Retrieval—A Graph-Based Point of View'. ArXiv:1401.6891 [Cs], Jan. 27, 2014. http://arxiv.org/ abs/1401.6891. Jan. 27, 2014.

Dai, Zhuyun, Chenyan Xiong, Jamie Callan, and Zhiyuan Liu. 'Convolutional Neural Networks for Soft-Matching N-Grams in Ad-Hoc Search'. In Proceedings of the Eleventh ACM International Conference on Web Search and Data Mining, 126-34. Marina Del Rey CA USA: ACM, 2018. https://doi.org/10.1145/3159652.3159659. 2018.

Fan, Yixing, Jiafeng Guo, Yanyan Lan, Jun Xu, Chengxiang Zhai, and Xueqi Cheng. 'Modeling Diverse Relevance Patterns in Ad-Hoc Retrieval'. The 41st International ACM SIGIR Conference on Research & Development in Information Retrieval, Jun. 27, 2018, 375-84. https://doi.org/10.1145/3209978.3209980. Jun. 27, 2018.

Fey, Matthias, and Jan E Lenssen. 'Fast Graph Representation Learning With Pytorch Geometric', 2019, 9. 2019.

Frome, Andrea, Greg S Corrado, Jonathon Shlens, Samy Bengio, Jeffrey Dean, Marc'Aurelio Ranzato, and Tomas Mikolov. 'DeViSE: A Deep Visual-Semantic Embedding Model', n.d., 11. 2019.

Gilmer, Justin, Samuel S. Schoenholz, Patrick F. Riley, Oriol Vinyals, and George E. Dahl. 'Neural Message Passing for Quantum Chemistry'. ArXiv:1704.01212 [Cs], Jun. 12, 2017. http://arxiv.org/abs/1704.01212. Jun. 12, 2017.

Gong, Yunchao, Qifa Ke, Michael Isard, and Svetlana Lazebnik. 'A Multi-View Embedding Space for Modeling Internet Images, Tags, and Their Semantics'. International Journal of Computer Vision 106, No. 2 (Jan. 2014): 210-33. https://doi.org/10.1007/s11263-013-0658-4. Jan. 2014.

Gong, Yunchao, Liwei Wang, Micah Hodosh, Julia Hockenmaier, and Svetlana Lazebnik. 'Improving Image-Sentence Embeddings Using Large Weakly Annotated Photo Collections'. In Computer Vision—ECCV 2014, edited by David Fleet, Tomas Pajdla, Bernt Schiele, and Tinne Tuytelaars, 8692:529-45. Lecture Notes in Computer Science. Cham: Springer International Publishing, 2014. https://doi.org/10.1007/978-3-319-10593-2_35. 2014.

Gordo, Albert, and Diane Larlus. 'Beyond Instance-Level Image Retrieval: Leveraging Captions to Learn a Global Visual Representation for Semantic Retrieval'. In 2017 IEEE Conference on Computer Vision and Pattern Recognition (CVPR), 5272-81. Honolulu, HI: IEEE, 2017. https://doi.org/10.1109/CVPR.2017.560. 2017.

Guo, Jiafeng, Yixing Fan, Qingyao Ai, and W. Bruce Croft. 'A Deep Relevance Matching Model for Ad-Hoc Retrieval'. Proceedings of the 25th ACM International on Conference on Information and Knowledge Management, Oct. 24, 2016, 55-64. https://doi.org/10.1145/2983323.2983769. 2016.

Hamilton, William L., Rex Ying, and Jure Leskovec. 'Inductive Representation Learning on Large Graphs'. ArXiv:1706.02216 [Cs, Stat], Sep. 10, 2018. http://arxiv.org/abs/1706.02216. 2018.

He, Kaiming, Xiangyu Zhang, Shaoqing Ren, and Jian Sun. 'Deep Residual Learning for Image Recognition'. ArXiv:1512.03385 [Cs], Dec. 10, 2015. http://arxiv.org/abs/1512.03385. 2015.

Hu, Peng, Liangli Zhen, Dezhong Peng, and Pei Liu. 'Scalable Deep Multimodal Learning for Cross-Modal Retrieval'. In Proceedings of the 42nd International ACM SIGIR Conference on Research and Development in Information Retrieval, 635-44. Paris France: ACM, 2019. https://doi.org/10.1145/3331184.3331213. 2019.

Hua, Xian-Sheng, Linjun Yang, Jingdong Wang, Jing Wang, Ming Ye, Kuansan Wang, Yong Rui, and Jin Li. 'Clickage: Towards Bridging Semantic and Intent Gaps via Mining Click Logs of Search Engines'. In Proceedings of the 21st ACM International Conference on Multimedia, 243-52. MM '13. New York, NY, USA: Association for Computing Machinery, 2013. https://doi.org/10.1145/2502081.2502283. 2013.

Huang, Po-Sen, Xiaodong He, Jianfeng Gao, Li Deng, Alex Acero, and Larry Heck. 'Learning Deep Structured Semantic Models for Web Search Using Clickthrough Data'. In Proceedings of the 22nd ACM International Conference on Conference on Information & Knowledge Management—CIKM '13, 2333-38. San Francisco, California, USA: ACM Press, 2013. https://doi.org/10.1145/2505515.2505665. 2013.

Hui, Kai, Andrew Yates, Klaus Berberich, and Gerard de Melo. 'Co-PACRR: A Context-Aware Neural IR Model for Ad-Hoc Retrieval'. ArXiv:1706.10192 [Cs], Jun. 30, 2017. http://arxiv.org/abs/1706.10192. 2017.

Hui, Kai, Andrew Yates, Klaus Berberich, and Gerard de Melo. 'PACRR: A Position-Aware Neural IR Model for Relevance Matching'. ArXiv:1704.03940 [Cs], Apr. 12, 2017. http://arxiv.org/abs/1704.03940. 2017.

Kan, Meina, Shiguang Shan, and Xilin Chen. 'Multi-View Deep Network for Cross-View Classification'. In 2016 IEEE Conference on Computer Vision and Pattern Recognition (CVPR), 4847-55. Las Vegas, NV, USA: IEEE, 2016. https://doi.org/10.1109/CVPR.2016.524. 2016.

Khasanova, Renata, Xiaowen Dong, and Pascal Frossard. 'Multi-Modal Image Retrieval with Random Walk on Multi-Layer Graphs'.

(56) References Cited

OTHER PUBLICATIONS

In 2016 IEEE International Symposium on Multimedia (ISM), 1-6. San Jose, CA, USA: IEEE, 2016. https://doi.org/10.1109/ISM.2016.0011. 2016.

Kingma, Diederik P., and Jimmy Ba. 'Adam: A Method for Stochastic Optimization'. ArXiv:1412.6980 [Cs], Dec. 22, 2014. http://arxiv.org/abs/1412.6980. 2014.

Kipf, Thomas N., and Max Welling. 'Semi-Supervised Classification with Graph Convolutional Networks'. ArXiv:1609.02907 [Cs, Stat], Sep. 9, 2016. http://arxiv.org/abs/1609.02907. 2016.

Lavrenko, Victor, and W. Bruce Croft. 'Relevance Based Language Models'. In Proceedings of the 24th Annual International ACM SIGIR Conference on Research and Development in Information Retrieval, 120-27. SIGIR '01. New York, NY, USA: Association for Computing Machinery, 2001. https://doi.org/10.1145/383952.383972. 2001.

Li, Canjia, Yingfei Sun, Ben He, Le Wang, Kai Hui, Andrew Yates, Le Sun, and Jungang Xu. 'NPRF: A Neural Pseudo Relevance Feedback Framework for Ad-Hoc Information Retrieval'. ArXiv:1810.12936 [Cs], Oct. 30, 2018. http://arxiv.org/abs/1810.12936. 2018.

Li, Qimai, Zhichao Han, and Xiao-Ming Wu. 'Deeper Insights into Graph Convolutional Networks for Semi-Supervised Learning'. ArXiv:1801.07606 [Cs, Stat], Jan. 22, 2018. http://arxiv.org/abs/1801.07606. 2018.

Lin, Tsung-Yi, Michael Maire, Serge Belongie, Lubomir Bourdev, Ross Girshick, James Hays, Pietro Perona, Deva Ramanan, C. Lawrence Zitnick, and Piotr Dollar. 'Microsoft COCO: Common Objects in Context'. ArXiv:1405.0312 [Cs], May 1, 2014. http://arxiv.org/abs/1405.0312. 2014.

Liong, Venice Erin, Jiwen Lu, Yap-Peng Tan, and Jie Zhou. 'Deep Coupled Metric Learning for Cross-Modal Matching'. IEEE Transactions on Multimedia 19, No. 6 (Jun. 2017): 1234-44. https://doi.org/10.1109/TMM.2016.2646180. 2017.

Liu, Shichen, Fei Xiao, Wenwu Ou, and Luo Si. 'Cascade Ranking for Operational E-Commerce Search'. In Proceedings of the 23rd ACM SIGKDD International Conference on Knowledge Discovery and Data Mining, 1557-65. Halifax NS Canada: ACM, 2017. https://doi.org/10.1145/3097983.3098011. 2017.

Mitra, Bhaskar, and Nick Craswell. 'An Updated Duet Model for Passage Re-Ranking'. ArXiv:1903.07666 [Cs], Mar. 18, 2019. http://arxiv.org/abs/1903.07666. 2019.

Mitra, Bhaskar, Fernando Diaz, and Nick Craswell. 'Learning to Match Using Local and Distributed Representations of Text for Web Search'. ArXiv:1610.08136 [Cs], Oct. 25, 2016. http://arxiv.org/abs/1610.08136. 2016.

Mitra, Bhaskar, Eric Nalisnick, Nick Craswell, and Rich Caruana. 'A Dual Embedding Space Model for Document Ranking'. ArXiv:1602.01137 [Cs], Feb. 2, 2016. http://arxiv.org/abs/1602.01137. 2016.

Nogueira, Rodrigo, and Kyunghyun Cho. 'Task-Oriented Query Reformulation with Reinforcement Learning'. ArXiv:1704.04572 [Cs], Sep. 24, 2017. http://arxiv.org/abs/1704.04572. 2017.

Pang, Liang, Yanyan Lan, Jiafeng Guo, Jun Xu, Jingfang Xu, and Xueqi Cheng. 'DeepRank: A New Deep Architecture for Relevance Ranking in Information Retrieval'. Proceedings of the 2017 ACM on Conference on Information and Knowledge Management, Nov. 6, 2017, 257-66. https://doi.org/10.1145/3132847.3132914. 2017.

Pei, Changhua, Yi Zhang, Yongfeng Zhang, Fei Sun, Xiao Lin, Hanxiao Sun, Jian Wu, Peng Jiang, and Wenwu Ou. 'Personalized Re-Ranking for Recommendation'. ArXiv:1904.06813 [Cs], Apr. 14, 2019. http://arxiv.org/abs/1904.06813. 2019.

Plummer, Bryan A., Liwei Wang, Chris M. Cervantes, Juan C. Caicedo, Julia Hockenmaier, and Svetlana Lazebnik. 'Flickr30k Entities: Collecting Region-to-Phrase Correspondences for Richer Image-to-Sentence Models'. ArXiv:1505.04870 [Cs], May 19, 2015. http://arxiv.org/abs/1505.04870. 2015.

Qi, Jinwei, and Yuxin Peng. 'Cross-Modal Bidirectional Translation via Reinforcement Learning'. In Proceedings of the Twenty-Seventh International Joint Conference on Artificial Intelligence, 2630-36. Stockholm, Sweden: International Joint Conferences on Artificial Intelligence Organization, 2018. https://doi.org/10.24963/ijcai.2018/365. 2018.

Renders, Jean-Michel, and Gabriela Csurka. 'NLE @ MediaEval'17: Combining Cross-Media Similarity and Embeddings for Retrieving Diverse Social Images', n.d., 3. 2019.

Rendle, Steffen, Christoph Freudenthaler, Zeno Gantner, and Lars Schmidt-Thieme. 'BPR: Bayesian Personalized Ranking from Implicit Feedback', 2009, 10. 2009.

Srivastava, Nitish, Geoffrey Hinton, Alex Krizhevsky, Ilya Sutskever, and Ruslan Salakhutdinov. 'Dropout: A Simple Way to Prevent Neural Networks from Overfitting', n.d., 30. 2019.

Szegedy, Christian, Sergey Ioffe, Vincent Vanhoucke, and Alex Alemi. 'Inception-v4, Inception-ResNet and the Impact of Residual Connections on Learning'. ArXiv:1602.07261 [Cs], Feb. 23, 2016. http://arxiv.org/abs/1602.07261. 2016.

Vaswani, Ashish, Noam Shazeer, Niki Parmar, Jakob Uszkoreit, Llion Jones, Aidan N. Gomez, Lukasz Kaiser, and Illia Polosukhin. 'Attention Is All You Need'. ArXiv:1706.03762 [Cs], Jun. 12, 2017. http://arxiv.org/abs/1706.03762. 2017.

Velic kovic, Petar, Guillem Cucurull, Arantxa Casanova, Adriana Romero, Pietro Lio, and Yoshua Bengio. 'Graph Attention Networks', 2018, 12. 2018.

Wang, Bokun, Yang Yang, Xing Xu, Alan Hanjalic, and Heng Tao Shen. 'Adversarial Cross-Modal Retrieval'. In Proceedings of the 25th ACM International Conference on Multimedia, 154-62. Mountain View California USA: ACM, 2017. https://doi.org/10.1145/3123266.3123326. 2017.

Wang, Liwei, Yin Li, Jing Huang, and Svetlana Lazebnik. 'Learning Two-Branch Neural Networks for Image-Text Matching Tasks'. IEEE Transactions on Pattern Analysis and Machine Intelligence 41, No. 2 (Feb. 1, 2019): 394-407. https://doi.org/10.1109/TPAMI.2018.2797921. 2019.

Wang, Liwei, Yin Li, and Svetlana Lazebnik. 'Learning Deep Structure-Preserving Image-Text Embeddings'. In 2016 IEEE Conference on Computer Vision and Pattern Recognition (CVPR), 5005-13. Las Vegas, NV, USA: IEEE, 2016. https://doi.org/10.1109/CVPR.2016.541. 2016.

Weston, Jason, Samy Bengio, and Nicolas Usunier. 'WSABIE: Scaling Up To Large Vocabulary Image Annotation', n.d., 7. 2019.

Wu, Yiling, Shuhui Wang, and Qingming Huang. 'Learning Semantic Structure-Preserved Embeddings for Cross-Modal Retrieval'. In Proceedings of the 26th ACM International Conference on Multimedia, 825-33. Seoul Republic of Korea: ACM, 2018. https://doi.org/10.1145/3240508.3240521. 2018.

Xiong, Chenyan, Zhuyun Dai, Jamie Callan, Zhiyuan Liu, and Russell Power. 'End-to-End Neural Ad-Hoc Ranking with Kernel Pooling'. Proceedings of the 40th International ACM SIGIR Conference on Research and Development in Information Retrieval, Aug. 7, 2017, 55-64. https://doi.org/10.1145/3077136.3080809. 2017.

Xu, Keyulu, Weihua Hu, Jure Leskovec, and Stefanie Jegelka. 'How Powerful Are Graph Neural Networks?' ArXiv:1810.00826 [Cs, Stat], Feb. 22, 2019. http://arxiv.org/abs/1810.00826. 2019.

Yan, Fei, and Krystian Mikolajczyk. 'Deep Correlation for Matching Images and Text'. In 2015 IEEE Conference on Computer Vision and Pattern Recognition (CVPR), 3441-50. Boston, MA, USA: IEEE, 2015. https://doi.org/10.1109/CVPR.2015.7298966. 2015.

Ying, Rex, Ruining He, Kaifeng Chen, Pong Eksombatchai, William L. Hamilton, and Jure Leskovec. 'Graph Convolutional Neural Networks for Web-Scale Recommender Systems'. Proceedings of the 24th ACM SIGKDD International Conference on Knowledge Discovery & Data Mining, Jul. 19, 2018, 974-83. https://doi.org/10.1145/3219819.3219890. 2018.

Zhai, Chengxiang, and John Lafferty. 'A Study of Smoothing Methods for Language Models Applied to Ad Hoc Information Retrieval', n.d., 9. 2019.

Zhang, Ying, and Huchuan Lu. 'Deep Cross-Modal Projection Learning for Image-Text Matching'. In Computer Vision—ECCV 2018, edited by Vittorio Ferrari, Martial Hebert, Cristian Sminchisescu, and Yair Weiss, 11205:707-23. Lecture Notes in Computer Science. Cham: Springer International Publishing, 2018. https://doi.org/10.1007/978-3-030-01246-5_42. 2018.

(56) References Cited

OTHER PUBLICATIONS

Zhu, Lin, Yihong Chen, and Bowen He. 'A Domain Generalization Perspective on Listwise Context Modeling'. ArXiv:1902.04484 [Cs], Feb. 12, 2019. http://arxiv.org/abs/1902.04484. 2019.
European Search Report for European Patent Application No. EP 20315159.2, filed on Apr. 14, 2020 Aug. 20, 2020.
Formal, Thibault et al., "Learning to Rank Images with Cross-modal Graph Convolutions," Springer Nature Switzerland AG, J.M. Jose et al. (Eds.): ECIR 2020, LNCS 12035, pp. 589-604, 2020. link.springer.com/chapter/10.1007/978-3-030-45439-5_39 2020.
Co-pending U.S. Appl. No. 17/170,393, filed Feb. 8, 2021 2021.
Eunjeong L. Park, Sungzoon Cho. "KoNLPy: Korean natural language processing in Python", Proceedings of the 26th Annual Conference on Human & Cognitive Language Technology, Chuncheon, Korea, Oct. 2014 (available on the Internet at lucypark.kr/docs/2014-10-10-hclt.pdf). 2014.
Co-pending U.S. Appl. No. 17/215,984, filed Mar. 29, 2021 2021.
Co-pending U.S. Appl. No. 17/215,323, filed Mar. 29, 2021 2021.
Ding, Jingtao, Guanghui Yu, Xiangnan He, Yong Li, and Depeng Jin. 'Sampler Design for Bayesian Personalized Ranking by Leveraging View Data'. ArXiv:1809.08162 [Cs], Sep. 21, 2018 2018.
He, Xiangnan, Jinhui Tang, Xiaoyu Du, Richang Hong, Tongwei Ren, and Tat-Seng Chua. 'Fast Matrix Factorization with Non-Uniform Weights on Missing Data'. ArXiv:1811.04411 [Cs, Stat], Jan. 7, 2019. 2019.
Ioffe, Sergey, and Christian Szegedy. 'Batch Normalization: Accelerating Deep Network Training by Reducing Internal Covariate Shift'. ArXiv:1502.03167 [Cs], Feb. 10, 2015. 2015.
Kingma, Diederik P., and Jimmy Ba. 'Adam: A Method for Stochastic Optimization'. ArXiv:1412.6980 [Cs], Dec. 22, 2014. 2014.
Lei, Yu, Wenjie Li, Ziyu Lu, and Miao Zhao. 'Alternating Pointwise-Pairwise Learning for Personalized Item Ranking'. In Proceedings of the 2017 ACM on Conference on Information and Knowledge Management, 2155-58. Singapore Singapore: ACM, 2017. 2017.
Liu, Tie-Yan. Learning to Rank for Information Retrieval. Berlin, Heidelberg: Springer Berlin Heidelberg, 2011. 2011.
Pan, Rong, Yunhong Zhou, Bin Cao, Nathan N. Liu, Rajan Lukose, Martin Scholz, and Qiang Yang. 'One-Class Collaborative Filtering'. In 2008 Eighth IEEE International Conference on Data Mining, 502-11. Pisa, Italy: IEEE, 2008. 2008.
Park E.L., Cho, S.: "KoNLPy: Korean natural language processing in Python", Proceedings of the 26th Annual Conference on Human & Cognitive Language Technology, Chuncheon, Korea, Oct. 2014 2014.
Rendle, Steffen, and Christoph Freudenthaler. 'Improving Pairwise Learning for Item Recommendation from Implicit Feedback'. In Proceedings of the 7th ACM International Conference on Web Search and Data Mining, 273-82. New York New York USA: ACM, 2014. 2014.
Rendle, Steffen, Christoph Freudenthaler, Zeno Gantner, and Lars Schmidt-Thieme. 'BPR: Bayesian Personalized Ranking from Implicit Feedback'. In Proceedings of the Twenty-Fifth Conference on Uncertainty in Artificial Intelligence, 452-61. UAI '09. Arlington, Virginia, USA: Auai Press, 2009. 2009.
Revaud, Jerome, Jon Almazan, Rafael Sampaio de Rezende, and Cesar Roberto de Souza. 'Learning with Average Precision: Training Image Retrieval with a Listwise Loss'. ArXiv:1906.07589 [Cs], Jun. 18, 2019. 2019.
Verberne, Suzan, Hans van Halteren, Daphne Theijssen, Stephan Raaijmakers, and Lou Boves. 'Learning to Rank for Why-Question Answering'. Information Retrieval 14, Apr. 2011 2011.
Wang, Yilin, Suhang Wang, Jiliang Tang, Huan Liu, and Baoxin Li. 'PPP: Joint Pointwise and Pairwise Image Label Prediction'. In 2016 IEEE Conference on Computer Vision and Pattern Recognition (CVPR), 6005-13. Las Vegas, NV, USA: IEEE, 2016 2016.
Wu, Ga, Maksims Volkovs, Chee Loong Soon, Scott Sanner, and Himanshu Rai. 'Noise Contrastive Estimation for One-Class Collaborative Filtering'. In Proceedings of the 42nd International ACM SIGIR Conference on Research and Development in Information Retrieval, 135-44. Paris France: ACM, 2019 2019.
Xue, Hong-Jian, Xinyu Dai, Jianbing Zhang, Shujian Huang, and Jiajun Chen. 'Deep Matrix Factorization Models for Recommender Systems'. In Proceedings of the Twenty-Sixth International Joint Conference on Artificial Intelligence, 3203-9. Melbourne, Australia: International Joint Conferences on Artificial Intelligence Organization, 2017 2017.
European Search Report Published on Nov. 26, 2020 for European Patent Application No. EP20305582.7, filed on Jun. 3, 2020 Nov. 26, 2020.
Chen, Wanyu; Cai, Fei; Chen, Honghui; De Rijke, Maarten; "Joint Neural Collaborative Filtering for Recommender Systems," ACM Transactions on Infomration Systems 1,1 (Jul. 2019) Jul. 2019.
Shen, Wei-Yuan; Lin, Hsuan-Tien; "Active Sampling of Pairs and Points for Large-scale Linear Bipartitie Ranking," arvix.org, Cornell Unversity, 201 Olin Library Cornell University, Ithaca, NY 14853 Aug. 24, 2017 Aug. 2017.

\* cited by examiner

TABLE 1

| model | HR@1 | NDCG@8 | NDCG@28 | MRR@28 |
|---|---|---|---|---|
| pointwise | 0.1596**(0.0043) | 0.3059**(0.0053) | 0.4502**(0.0029) | 0.3151**(0.0042) |
| pairwise | 0.1568**(0.0075) | 0.2968**(0.0037) | 0.4447**(0.0032) | 0.3090**(0.0058) |
| listwise | 0.1638**(0.0022) | 0.2999**(0.0037) | 0.4474**(0.0017) | 0.3141**(0.0026) |
| adaptive $g$ | 0.1714(0.0067) | 0.3138(0.0054) | 0.4553(0.0040) | 0.3238(0.0052) |

Figure 4

TABLE 2

| model | HR@1 | NDCG@8 | NDCG@28 | MRR@28 |
|---|---|---|---|---|
| pointwise | 0.1897(0.0061) | 0.3539**(0.0034) | 0.4757**(0.0032) | 0.3456**(0.0048) |
| pairwise | 0.1847**(0.0049) | 0.3540**(0.0041) | 0.4746**(0.0032) | 0.3436**(0.0046) |
| listwise | 0.1838**(0.0067) | 0.3430**(0.0078) | 0.4688**(0.0052) | 0.3381**(0.0065) |
| adaptive $g$ | 0.1947(0.0082) | 0.3628(0.0078) | 0.4811(0.0057) | 0.3531(0.0073) |

Figure 5

TABLE 3

| model | HR@1 | NDCG@8 | MRR@8 |
|---|---|---|---|
| pointwise | 0.3054**(0.0139) | 0.6269**(0.0062) | 0.5183**(0.0089) |
| pairwise | 0.3153**(0.0098) | 0.6340**(0.0047) | 0.5264**(0.0069) |
| listwise | 0.3109**(0.0090) | 0.6269**(0.0053) | 0.5182**(0.0076) |
| adaptive $g$ | 0.3264(0.0130) | 0.6399(0.0083) | 0.5352(0.0112) |

Figure 6

ADAPTIVE POINTWISE-PAIRWISE LEARNING TO RANK

PRIORITY INFORMATION

Pursuant to 35 U.S.C. § 119 (a), this application claims the benefit of earlier filing date and right of priority to European Patent Application Number EP 20305582, filed on Jun. 3, 2020, the contents of which are hereby incorporated by reference in their entirety.

BACKGROUND

Learning-to-rank or machine-learned-ranking is the application of machine learning in the construction of ranking models for information retrieval systems. For this purpose, a ranking model is first trained on the basis of training data, which consists of lists of "items" (e.g., any types of documents or objects) associated to an (i.e., for a given) "entity" that may be any one of a context, a user, or a user query, with some known partial order specified between the items in each list.

The items can be ordered through a numerical or ordinal score or through a binary judgment (e.g. "relevant" or "not relevant") for each item. The ranking model's purpose is to model the relevance relationship (represented by a scoring function) between an item and any one of a context, a user, or a user query, thereby allowing to rank any set of items for a given context, a user, or a user query, in a way which is "similar" to rankings known from the training data.

In the rest of the document, for the sake of readability, it will mostly be referred to a "user" instead of an "entity" or any one of a context, a user, or a user query. However, it is to be understood that these terms are used interchangeably throughout the document and that any reference to a user may therefore equally refer to a context or to a (user) query. Further, any reference to a "set of users" refers in fact more generally to a "set of entities" or "set of any one of a context, a user, or a user query," so that a single set of users may in fact contain different types of entities (contexts, users, and/or user queries).

For the convenience of learning-to-rank algorithms, items and users are usually represented by numerical vectors, which are called embeddings. In more detail, a user can be associated to measurable observations (e.g., its demographics, . . . ) that are called user features (or, equivalently, user feature vector). In the same way, an item can be associated to measurable observations (e.g., its content, producer, price, creation time, . . . ) that are called item features (or, equivalently, item feature vector).

However, learning-to-rank or machine-learned-ranking machine learning algorithms tend to use "higher semantic level" representations, which are more adapted to the task of obtaining a scoring function that allows the ordering of the items according to their relevance to a given user. These higher level representations are called "embeddings" (and sometimes latent factors, because the higher level representations are not directly observed and/or measured). In the rest of the document, the term embedding will be used. In particular, $\vec{u}$, will denote the user embedding and $\vec{\imath}$ will denote the item embedding.

Ranking is particularly useful in information retrieval problems, but may also be used in other fields of computer science as diverse as machine translation, computational biology, recommender systems, software engineering, or robotics.

The learning-to-rank models are classified in three groups of approaches in terms of input representation and loss function used to train the models: the pointwise, pairwise, and listwise approaches.

In the pointwise approach, each <user, item> pair in the training data has a relevance grade. Then the learning-to-rank problem can be approximated by a classification problem (when relevance grades are binary) or by an ordinal regression problem: given a single <user, item> pair, to predict its score.

In the pairwise approach, the learning-to-rank problem is approximated by a pair classification problem: learning a binary classifier that can tell, for a given user, which item is better in a given pair of items.

Finally, in the listwise approach, a ranking performance measure defined at the level of the list is optimized directly.

When designing recommender systems and, especially, "learning-to-rank" strategies, the issue is that of choosing which one of the "pointwise," "pairwise," and "listwise" approaches should be adopted, depending on the data distribution (e.g., sparsity level, label noise, input feature distribution, . . . ).

Each approach has its own advantages and drawbacks, in terms of ranking performance, robustness to noise, and computational complexity. To alleviate the weaknesses, researchers in each approach have developed "ad-hoc" improvements, often based on heuristics.

For instance, pointwise approaches can be improved by specific instance-weighting schemes and by using user-level feature normalization (e.g., removing the "user rating bias"). Pairwise approaches, which are very sensitive to label noise and to the choice of the "negative" instances, have been enhanced by specific sampling strategies when feeding the "learning-to-rank" algorithm with training "triplets."

Even if pointwise and pairwise approaches have their own complementary advantages and drawbacks, most of the conventional frameworks focus on only one approach, trying to mitigate their drawbacks in some ad-hoc way.

Wang, Y., Wang, S., Tang, J., Liu, H., Li, B.: "PPP: joint pointwise and pairwise image label prediction", in: 2016 IEEE Conference on Computer Vision and Pattern Recognition, CVPR 2016, Las Vegas, NV, USA, Jun. 27-30, 2016, pages 6005 to 6013, relates to image label prediction. A joint pointwise and pairwise approach is disclosed according to which the two loss functions corresponding to the pointwise and pairwise approaches are added, and the problem is solved jointly through a gradient descent on the total loss at every iteration.

Lei, Y., Li, W., Lu, Z., Zhao, M.: "Alternating pointwise-pairwise learning for personalized item ranking", in: Proceedings of the 2017 ACM on Conference on Information and Knowledge Management, CIKM '17, ACM, New York, NY, USA, pages 2155 to 2158, relates to personalized item ranking. A joint pointwise and pairwise approach is disclosed according to which the two loss functions corresponding to the pointwise and pairwise approaches are also added, as in Wang et al., but the problem is solved alternately through a gradient descent on the pointwise loss followed by a gradient descent on the pairwise loss.

Thus, it is desirable to utilize the pointwise and pairwise approaches in an adaptive way.

Moreover, it is desirable to provide an adaptive pointwise-pairwise learning-to-rank method that overcomes the above deficiencies.

Furthermore, it is desirable to provide an adaptive pointwise-pairwise learning-to-rank method that introduces a (meta-)learnable adaptive combination of the two approaches, so that the precise balance between pointwise and pairwise contributions depends on a particular triplet instance <user u, item i, item j> taken as input.

Also, it is desirable to provide an adaptive pointwise-pairwise learning-to-rank method that is not mutually exclusive, but combines the pointwise and pairwise approaches for the same task and dataset, and describes a way, learned from the data, to combine the pointwise and pairwise approaches optimally and adaptively.

BRIEF DESCRIPTION OF THE DRAWINGS

The drawings are only for purposes of illustrating various embodiments and are not to be construed as limiting, wherein:

FIG. 4 shows Table 1;

FIG. 5 shows Table 2; and

FIG. 6 shows Table 3.

DETAILED DESCRIPTION

Figure 1:
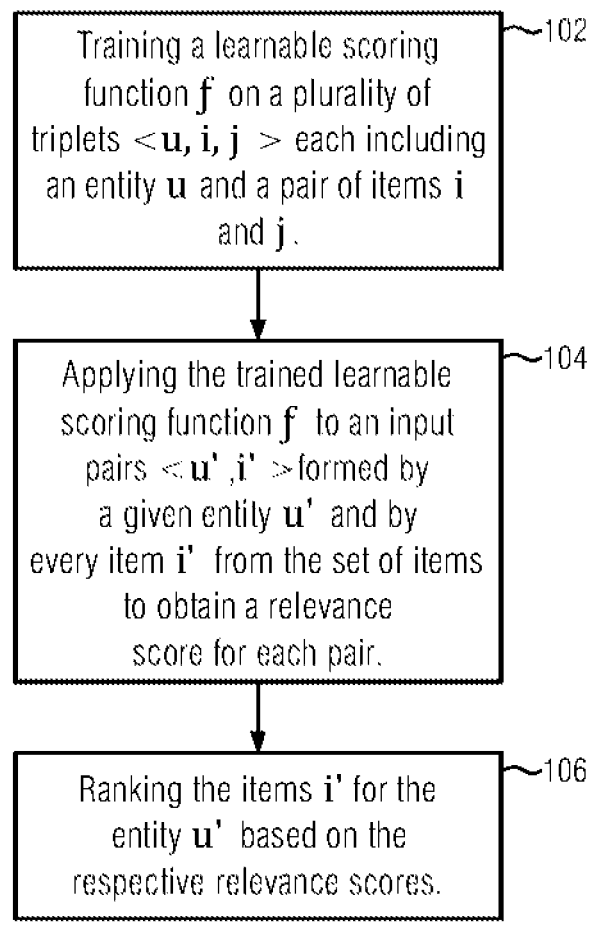
FIG. 1 is a functional block diagram illustrating a method of ranking items for a given entity according to an embodiment.

Described herein are systems and methods for ranking items in relationship with their relevance to a user. For purposes of explanation, numerous examples and specific details are set forth in order to provide a thorough understanding of the described embodiments.

The illustrative embodiments will be described with reference to the drawings wherein like elements and structures are indicated by like reference numbers.

In a "learning-to-rank" problem, the task is to obtain a scoring function $f$ that allows the ordering of items according to their relevance to a given user (most of the time in decreasing order). In more detail, this function, which must be learnable (i.e., it must depend on a set of learnable parameters, called θ), takes as input a pair <user u, item i> and outputs a relevance score of the item i for the user u.

In order to obtain a scoring function $f$ able to optimally score items according to their relevance for a given user, the scoring function must first be "trained." The "training phase" of the scoring function aims at optimizing internal, learnable parameters of the scoring function by training it on a set of triplets <user u, item i, item j> for which the expected result is known (i.e., in the present case, the relative relevancies of items i and j for the user u, as explained in more detail below).

For this purpose, the scoring function is applied to the pair <u, i> and outputs a relevance score of the item i for the user u. Similarly, the scoring function is applied to the pair <u, j> and outputs a relevance score of the item j for the user u. The items i and j can then be ranked (for the user u) according to their respective relevance scores.

An adequately chosen loss function can then be applied to the ranking for evaluating the efficiency (or degree of validity) of this ranking, based on the known respective relevancies of items i and j for the user u.

In machine learning, a loss function (also called "cost function" or simply "loss") is a function that measures the discrepancy between the output of a model and the desired target/reference. For a given user and a given set of items, once a ranking has been obtained by applying the learnable scoring function to each of the items of the set and by ranking them according to their respective relevance scores, the better the obtained ranking is, the smaller will be the result of the loss function.

The aim of the training phase is to modify the internal learnable parameters of the learnable scoring function so that the learnable parameters minimize the result of the loss function. This optimization of the loss function (which must be convergent towards a minimum) is rendered possible by "gradient descent optimization", where gradients are obtained from the partial derivatives of the loss function with respect to the learnable parameters of the learnable scoring function.

These loss gradients are "back-propagated" to the respective learnable parameters in that the loss gradients are used to modify (or adapt or update) the learnable parameters to perform better at the next iteration of the training phase. At the next iteration, the learnable scoring function will output a probability of having the item i preferred to the item j by the user u computed with the help of the modified learnable parameters. This probability will better reflect the correct ranking of the items, leading to a lower value of the loss function and to a smaller adaptation of the learnable parameters at each iteration of the gradient descent optimization, until the loss function converges towards a minimum and no adaptation of the learnable parameters is necessary anymore. Once the loss function has converged, the learnable scoring function has been successfully trained, and the learnable scoring function can then be used to perform item ranking.

While the explanations given above have been given in the context where the loss function must be minimized, which is the standard case in the field, it is to be understood that in an alternative embodiment, with a minor mathematical redefinition of the loss function, the training phase of the model may aim at maximizing a corresponding function, which is called "objective function" (or "gain function" or simply "utility").

Thus, in order to encompass both embodiments, it will be referred in the following more generally to the "optimization" of the loss function, which may then be minimized or maximized, depending on the specific definition of the loss function when training a given ranking model.

Pointwise ranking directly estimates the relevance of an item (or document) i for a user u, considering the relevance estimation as a classification problem or as an ordinal regression problem (for graded relevancies). Groundtruth relevance labels in the training set (i.e., a label for each given item of the training set stating whether the given item is relevant or not) are given either explicitly by manual relevance assessments, or by user clicks (implicit user feedback).

In the latter case, some propensity weighting strategy should be used to compensate for the different biases (e.g. position or layout biases). Most of the recommendation models assume that the relevance probability of an item i for user u can be expressed in the following form:

$$P(i|u) = \sigma(f(u, i; \theta))$$

where σ is typically the sigmoid function ($\sigma(x) = 1/(1+e^{-x})$), and $f(u, i; \theta)$ is the learnable scoring function mentioned above, with a set of learnable parameters θ (which may be, in alternative embodiments, a vector or a matrix of parameters), that estimates the relevance score of the item i for the user u. In other words, it estimates the likelihood of the item i to be clicked by the user u.

As mentioned before, the learnable scoring function $f$ and its associated parameters θ can be learned by solving a classification task, which classifies the item i as positive class ($y_{u,i}=1$) if it is clicked by the user u (or manually assessed as relevant) or as negative class ($y_{u,i}=0$) if it is not clicked by the user u (or manually assessed as irrelevant). The learnable parameters θ of the classification function can be learned by maximizing the likelihood of correct relevance of an item i for a user u:

$$\operatorname*{argmax}_{\theta} \prod_{(u,i) \in D, y_{u,i}=1} p(i|u) \prod_{(u,i) \in D, y_{u,i}=0} (1 - p(i|u))$$

This amounts to minimizing the binary cross entropy loss $\mathcal{L}_{pointwise}$ which is given by:

$$\mathcal{L}_{pointwise}(\theta) = \\ - \sum_{(u,i) \in D} (y_{u,i} \log \sigma(f(u,i;\theta)) + (1 - y_{u,i}) \log(1 - \sigma(f(u,i;\theta)))) + \lambda \|\theta\|$$

where $\lambda \|\theta\|$ is a regularization term on θ, λ is the regularization constant, which is an hyper-parameter, and $\|\theta\|$ denotes a norm of θ.

In one embodiment, it denotes the squared L2-Norm of θ, which has been used in the experimental setup described below. In alternative embodiments, a L1-Norm, a L2-Norm, or more generally any other Ln-Norm, or a squared version of these norms can also be used, where n is an integer greater than 2.

Pairwise ranking focuses on the relative order between a pair of items (or documents) to achieve correct ranking of this set of items for a given user. One specific version of pairwise ranking is Bayesian Personalized Ranking (BPR) which optimizes the model parameters during training by maximizing the estimated probability of an item i to be preferred to an item j for a user u. This estimated probability is given by:

$$p(i>j|u)=p(j<i|u)=\sigma(f(u,i;\theta)-f(u,j;\theta))$$

where $f(u, i; \theta)$ is again the learnable scoring function that assigns a relevance score of the item i for the user u and σ is the sigmoid function introduced above. A further variable $y_{u,i>j}$ is defined, with $y_{u,i>j}=1$ when user u prefers item i over j, and $y_{u,i>j}=0$ otherwise. The estimated probability $p(i>j|u)$ is expected to be high when $y_{u,i>j}=1$, and to be low in the opposite case ($y_{u,j>i}=1$).

Maximizing the user preference over different items corresponds to maximizing the likelihood of correct ordering for any item pair (i, j) given a user u:

$$\operatorname*{argmax}_{\theta} \prod_{(u,i,j) \in D, y_{u,i>j}=1} p(i>j|u) \prod_{(u,i,j) \in D, y_{u,j>i}=1} p(i<j|u)$$

Maximizing this likelihood amounts to minimizing the following binary cross entropy loss:

$$\mathcal{L}_{pairwise}(\theta) = \sum_{(u,i,j) \in D} (y_{u,i>j} \log \sigma(f(u,i;\theta) - f(u,j;\theta)) + \\ (1 - y_{u,i>j}) \log(1 - \sigma(f(u,i;\theta) - f(u,j;\theta)))) + \lambda \|\theta\|)$$

The pairwise ranking approach better formulates the ranking problem by using relative preference (ordering) between two items. In particular, it does not require any inter-user normalization, which might be necessary in pointwise approaches to mitigate the inter-user variance. Pairwise approaches are less sensitive to class imbalance than pointwise approaches. Despite this, the pairwise ranking approach is more sensitive to noisy labels than pointwise ranking approach. The implicit feedback naturally brings some noise since some irrelevant items could be clicked by mistake or some relevant items might not be clicked by the user.

Hence, a learning strategy is proposed so that the model can decide itself, for each triplet <u, i, j>, which one of the pointwise and the pairwise approaches should be adopted. The proposed "meta-learning" strategy considers that there is a continuum between the pointwise and the pairwise approaches: how to position the cursor in this continuum should be learned from the data and should be dependent on the considered triplet. This can be done by utilizing a weighting coefficient γ which softly determines the compromise between pointwise and pairwise ranking. The idea is to modify the estimated probability $p(i>j|u)$ as follows:

$$p(i>j|u)=\sigma(f(u,i;\theta)-\gamma f(u,j;\theta))$$

where γ can take values between [0,1].

In one embodiment, γ is a constant hyperparameter to be tuned/chosen on a validation set (together with other hyperparameters).

In another embodiment, γ is computed as a function of user u, items i and j (possibly including the ranks of these items): $\gamma = g(u, i, j; \theta_g)$, where $\theta_g$ is another set of learning parameters distinct from θ ($\theta_g$ may be, in alternative embodiments, a vector or a matrix of parameters).

The learnable function g is also called the mixing function. One possible formulation of g would be a similarity function, which is a real-valued function that quantifies the similarity between two objects, in that it takes large values for similar objects and small values close to zero for very dissimilar objects. Any similarity function fulfilling these requirements may be used.

Consequently, the negative log-likelihood loss function can be formulated as:

$$\mathcal{L}_{adaptive}(\theta, \theta_g) = \\ - \sum_{(u,i,j) \in D} (y_{u,i>j} \log \sigma(f(u,i;\theta) - g(u,i,j;\theta_g) f(u,j;\theta)) + (1 - y_{u,i>j}) \\ \log(1 - \sigma(f(u,i;\theta) - g(u,i,j;\theta_g) f(u,j;\theta)))) + \lambda \|\theta\| + \lambda_g \|\theta_g\|$$

where $\lambda \|\theta\|$ is a regularization term on θ and $\lambda_g \|\theta_g\|$ is a regularization term on $\theta_g$, λ and $\lambda_g$ are the regularization constants, which are hyper-parameters, and $\|\theta\|$ and $\|\theta\|$ denote a norm of θ and $\theta_g$.

In one embodiment, it denotes the squared L2-Norm, which has been used in the experimental setup described below. In alternative embodiments, a L1-Norm, a L2-Norm, or more generally any other Ln-Norm, or a squared version of these norms can also be used, where n is an integer greater than 2.

$\mathcal{L}_{adaptive}(\theta, \theta_g)$ reduces to $\mathcal{L}_{pointwise}(\theta)$ when γ, i.e., g(u, i, j; $\theta_g$), equals to 0, and to $\mathcal{L}_{pairwise}(\theta)$ when γ equals to 1.

In particular, depending on the particular triplet <u, i, j>, the corresponding term in the loss function could correspond to (i) learning to classify a positive instance when g(u, i, j; $\theta_g$) is close to 0 and $y_{u,i>j}$=1; (ii) learning to classify a negative instance when g(u, i, j; $\theta_g$) is close to 0 and $y_{u,j>i}$=1; and (iii) learning to rank i higher than j when g(u, i, j; $\theta_g$) is close to 1 and $y_{u,i>j}$=1.

Note that the complete loss function in $\mathcal{L}_{adaptive}(\theta, \theta_g)$ considers all "positive" pairs ($y_{u,i>j}$=1) as well as all "negative" pairs ($y_{u,i>j}$=0). While these two terms could seem to be redundant at first glance, this is not the case: only considering the first term would lead to a trivial solution where g(u, i, j; $\theta_g$) is 0 everywhere and the problem would reduce to train a binary classifier with only positive examples (any model $f(\bullet; \theta)$ that outputs a constant very high value would be perfect). The second term enforces the inclusion of "negative" examples as well, either in pointwise way, or in a pairwise way.

In a first embodiment, as mentioned above, the mixing function is a constant hyperparameter. In alternative embodiments, however, the mixing function varies as a function of its parameters. In the following, concrete examples are given on how the mixing function g(u, i, j; $\theta_g$) can be implemented.

In a second embodiment, a purely Collaborative-Filtering setting is considered, in which only the interactions of the users with the items are taken into account, when the attributes and the content (e.g. the title and the body of the item) of the items and the users are not available. In this context, attributes of an item denote specific aspects contained in or related to the item (e.g. through metadata).

For example, for items being documents like the news articles considered below in the experimental setup, the attributes of an item are, e.g., words, features, topic, entities, or any other specific aspect of the document. The content of an item denotes broadly the whole data contained in the item, e.g. the title and the body of the document, as well as additional metadata (such as date of creation, author(s), popularity, . . . ) if the item is a document Technically speaking, in the Collaborative-Filtering setting, the only available data consists of a sparse interaction matrix R, encoding the rating or the click action of a user u for an item i. In this case, the features associated to a user are the items she interacted with in the past, as represented by the corresponding row in the R matrix. Reciprocally, the features associated to an item are the users who interacted with it in the past, as represented by the corresponding column in the R matrix.

Using standard matrix factorization techniques applied to the interaction matrix R, the relevance score function $f(u, i; \theta)$ takes the form of:

$$f(u,i;\theta)=\vec{u}^T \cdot \vec{\iota}$$

where $\vec{u}$ and $\vec{\iota}$ (E, $\mathbb{R}^k$) are the embeddings associated to u and i respectively. By virtue of matrix factorization, an element R(u, i) of the interaction matrix R is given by R(u, i)≅$\vec{u}^T \cdot \vec{\iota}$.

In an embodiment, the embeddings are derived from the decomposition of the matrix R into two low rank matrices. Alternatively, these embeddings are obtained as output of two neural networks (e.g. multi-layer perceptrons), when using deep matrix factorization models.

In an embodiment, for this Collaborative-Filtering setting, the mixing function is defined by:

$$g(u,i,j;\theta_g)=\sigma(\vec{\iota}^T \cdot W_g \cdot \vec{j})$$

where $\vec{j}$ is the embedding of item j.

In one embodiment, $W_g$ is a k*k symmetric positive semi-definite matrix, typically of rang k' much lower than the dimensionality k of $\vec{\iota}$. In other words, $W_g$ is chosen as $W_g = V_g^T V_g$, with $V_g$ a k'*k matrix. In this disclosure, "much lower" means one or more orders of magnitude lower. Typically, k' is chosen to be of an order of magnitude of $10^2$, e.g. k'=30, whereas k is chosen to be of an order of magnitude of $10^3$, e.g. k=300.

In this embodiment, the mixing function g can be interpreted as a generalized similarity measure between items i and j, where the metrics is learned from the data. In further embodiments, more complex models are considered, such as a model taking into account the ranks of i and j or a model using more than one (linear) layer, provided that their complexity is compatible with the size and the distribution of the training data.

In an embodiment, $V_g = \theta_g$ is the set of learnable parameters defined above, which in that case is a matrix of dimension k'*k, which can be initialized with small random numbers generated for example with a Gaussian distribution around zero. In alternative embodiments, $V_g$ can be a more complex function of $\theta_g$.

In another embodiment, $W_g$ is chosen as a diagonal matrix: $W_g = \text{diag}(\theta_g)$, where the set of learnable parameters $\theta_g$ is a vector of dimension k and $W_g$ is a diagonal matrix whose diagonal is given by $\theta_g$ and whose other values are zero. In both cases, the goal is to constraint the $W_g$ matrix to have much less parameters to learn.

Intuitively, this kind of mixing function materializes the fact that "negative" items that are more similar to a "positive" item are more valuable candidates than "far away" negative items to form training triplets. But the precise metrics that defines this similarity is learned from the data.

In a third, more general embodiment, a purely Content-Based setting is considered, where the attributes and the content of the items and of the users are taken into account. A learnable user embedding function $e_U$ is used, that maps user features into a more powerful representation, as well as a learnable item embedding function $e_I$ that maps item features into the same space as the user embedding: it amounts to telling that the embeddings are defined by $\vec{u}=e_U(x_u; \theta_1)$ and $\vec{\iota}=e_I(x_i; \theta_2)$, where $\theta_1$ and $\theta_2$ are two learnable parameters. These functions can take the form of simple linear transforms or deep neural networks.

Similar to the above mentioned Collaborative-Filtering setting, the relevance score function is given by $f(u, i; \theta) = \vec{u}^T \cdot \vec{\iota}^T$, and the following mixing function is used:

$$g(u,i,j;\theta_g)=\sigma(\vec{\iota}^T \cdot W_g \cdot \vec{j})$$

with $\vec{j}=e_I(x_j; \theta_2)$.

In one embodiment, $W_g$ is a k*k symmetric positive semi-definite matrix, typically of rang k' much lower than the dimensionality k of $\vec{\iota}$. In other words, $W_g$ is chosen as $W_g = V_g^T V_g$, with $V_g$ a k'*k matrix. The same typical orders of magnitude or values as the ones discussed above for the Collaborative-Filtering setting for k and k' can also be used in the Content-Based setting.

In an embodiment, $V_g=\theta_g$, where the set of learnable parameters $\theta_g$ is the matrix of dimension k'*k defined above, which again can be initialized for example with small values generated by a Gaussian distribution around zero. In alternative embodiments, $V_g$ can be a more complex function of $\theta_g$.

In another embodiment, $W_g$ is chosen as a diagonal matrix: $W_g=\text{diag}(\theta_g)$, where the set of learnable parameters $\theta_g$ is a vector of dimension k and $W_g$ is a diagonal matrix whose diagonal is given by $\theta_g$ and whose other values are zero. In both cases, the goal is to constraint the $W_g$ matrix to have much less parameters to learn.

Alternatively, in all cases mentioned above, the mixing function can be expressed directly in terms of item features:

$$g(u,i,j;\theta_g)=\sigma(x_i^T \cdot W_g \cdot x_j)$$

with the same symmetric semi-definite positive and low rank constraints on $W_g$. As in the Collaborative-Filtering setting, more complex models could be envisaged as well, such as the one including the ranks of i and j or the one using more than one (linear) layer, provided that their complexity is compatible with the size and the distribution of the training data FIG. 1 is a functional block diagram illustrating a method of ranking items for a given entity. At step 102, at which a learnable scoring function $f$ is trained on a set of triplets <u, i, j> each comprising an entity u (an entity is defined to be any user, context, or user query) from a set of entities (or set of any user, context, or user query comprising any combination of users, contexts, and user queries) and a pair of items i and j from a set of items, wherein a relative relevance of items i and j for entity u is known for each triplet <u, i, j> of the set.

Figure 2:
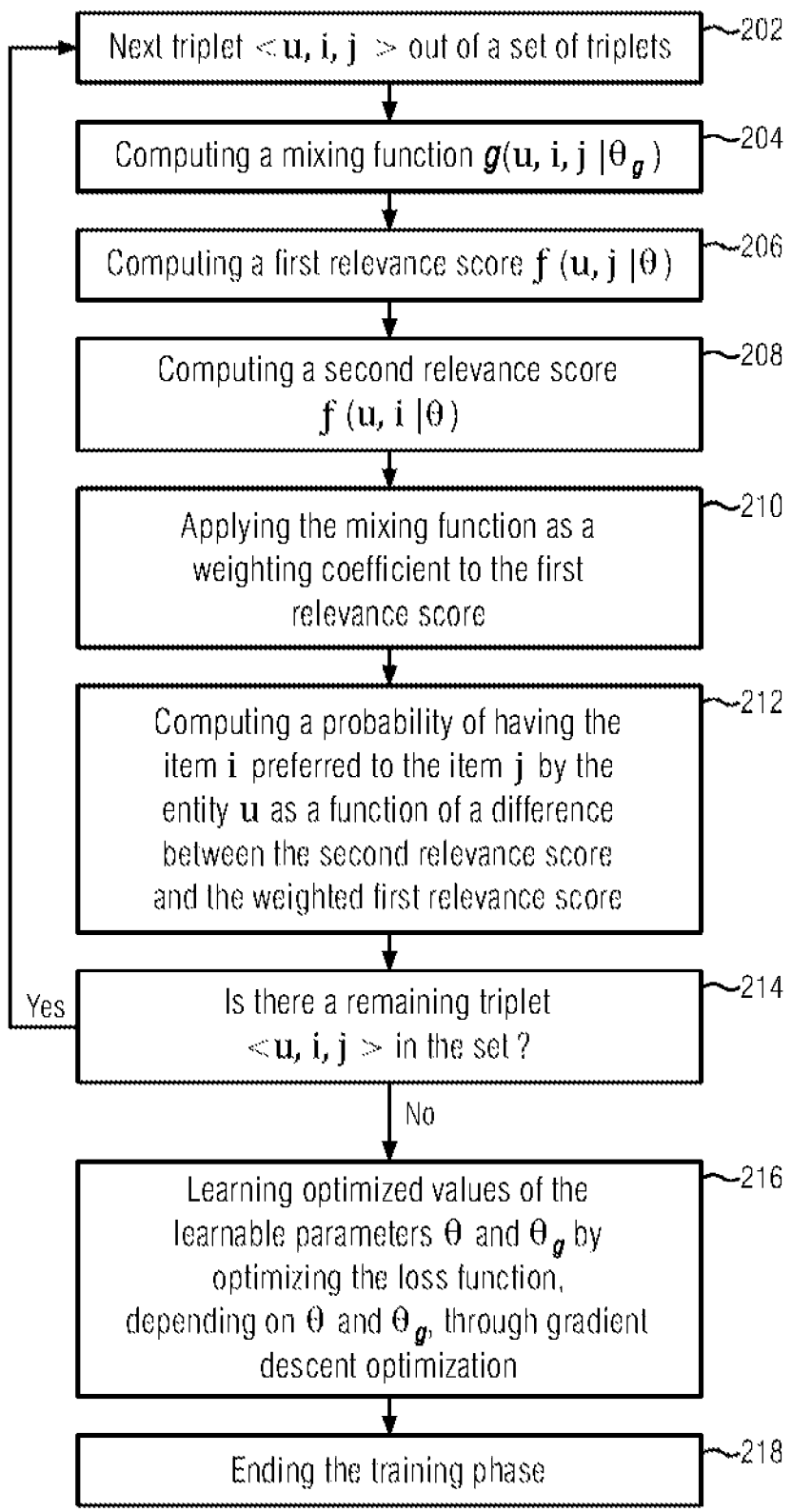
FIG. 2 is a functional block diagram illustrating sub-steps of step 102 of FIG. 1 for training a learnable scoring function on a set of triplets according to an embodiment.

This training step aims at learning optimized values of a first set of learnable parameters $\theta$ of the learnable scoring function. This is achieved by optimizing a loss function depending on the first set of learnable parameters $\theta$, a second set of learnable parameters $\theta_g$, and on a probability of having the item i preferred to the item j by the entity u, wherein the probability defines a continuum between pointwise ranking and pairwise ranking of items through a learnable mixing function depending on $\theta_g$. $\theta$ and $\theta_g$ may be vectors or matrixes of parameters, depending on the embodiments. Further technical details on this training step are illustrated in FIG. 2.

At step 104, the trained learnable scoring function $f$ (for which the optimized values of the first set of learnable parameters $\theta$, on which $f$ depends, have now been determined in the training phase) is then applied (using the optimized values of $\theta$) to all pairs <u', i'> formed by a given entity u' from the set of entities and by every item i' from the set of items, to obtain a relevance score for each pair.

At step 106, all items i' from the set of items are ranked for the entity u' based on the respective relevance scores.

In an embodiment, the items are ranked by decreasing relevance score.

Alternatively, the items are ranked by increasing relevance score. Further, in an embodiment, the ranked items are provided (presented, sent, displayed, . . . ) to the entity u'. This achieves the goal of the "learning to rank" problem defined above.

Figure 3:
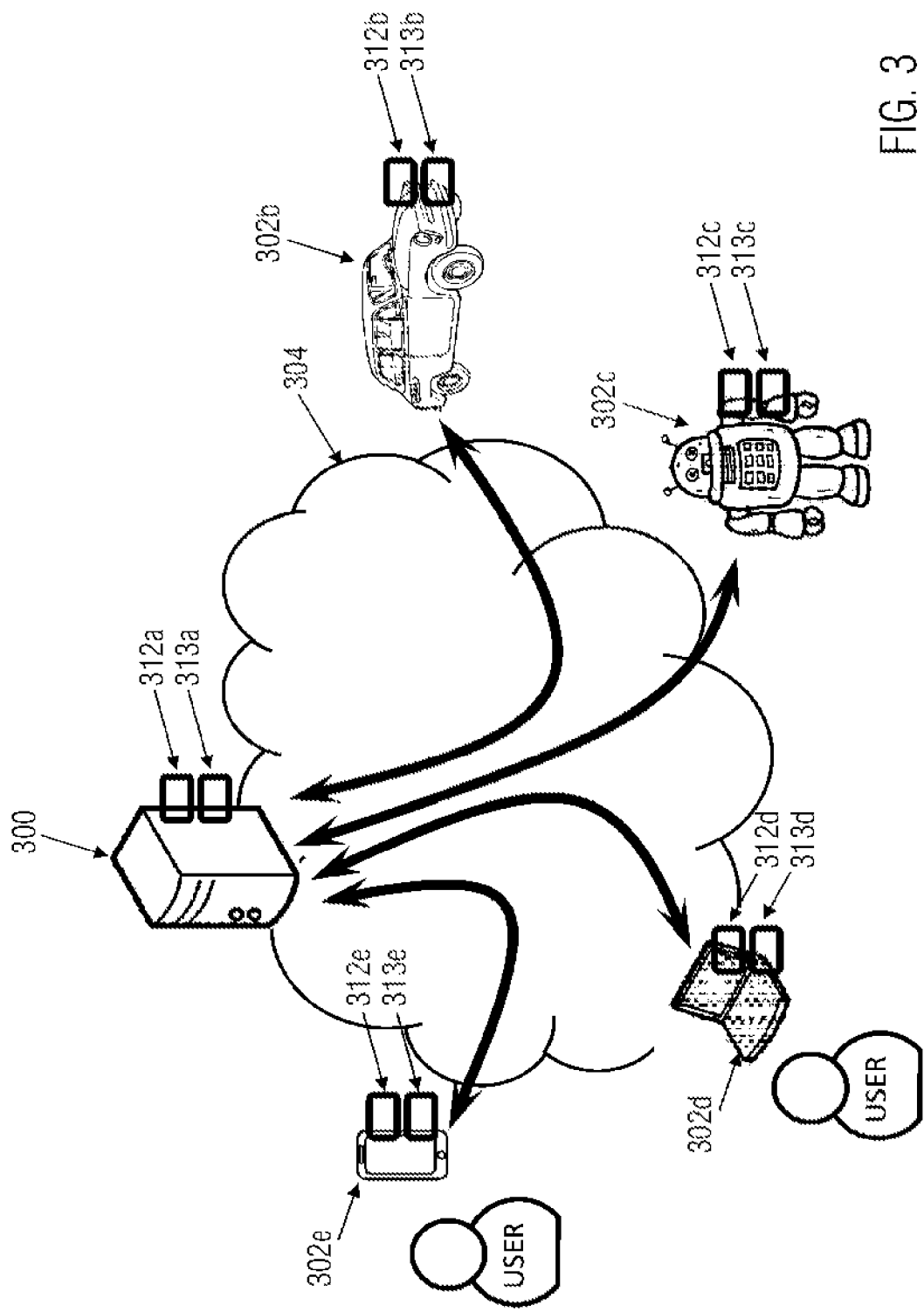
FIG. 3 illustrates an example of architecture in which the disclosed methods may be performed.

In an embodiment, this ranking can be used to automatically control client devices, including e.g. autonomous vehicles, robots, computers, or cell phones, as illustrated in FIG. 3.

In an embodiment, a controller of a client device like the above mentioned ones takes the result of the ranking output at step 104 of the method of FIG. 1 to determine a control command to be performed by the client device.

FIG. 2 is a functional block diagram illustrating sub-steps of the method step 102 of FIG. 1 for training a learnable scoring function on a plurality of triplets.

At step 202, a (next) triplet <u, i, j> from the set of triplets defined in step 102 of FIG. 1 is taken as input, and a loop of steps 204 to 214 is performed so that steps 204 to 214 are applied to each input triplet until there are no remaining triplets in the set, as indicated by the condition defined in step 214 (at which it is determined whether there is still a remaining triplet in the set).

If it is determined at step 214 that there is no remaining triplet in the set, the value of the loss function can be computed (as a sum over all the triplets of the set) and gradient descent optimization can be performed at step 216 to optimize the values of the sets of learnable parameters $\theta$ and $\theta_g$.

In more detail, as the learnable parameters are gradually adapted until convergence of the loss function towards its optimum, a loop of steps 202 to 216 (not shown) takes place until convergence of the loss function is achieved. When the loss function has converged to its optimum (minimum or maximum, as discussed above), the optimized values of $\theta$ and $\theta_g$ are obtained at (the last occurrence of) step 216 and the training phase of step 102 of FIG. 1 ends at step 218.

At step 204, a weighting coefficient $g(u, i, j; \theta_g)$ is computed by applying the learnable mixing function g to the entity u, the two items i and j, and the second set of learnable parameters $\theta_g$. The weighting coefficient is a value within the interval [0,1], which will be applied as a weighting coefficient to the first relevance score $f(u, j; \theta)$ at step 210.

In an embodiment, as mentioned above, the mixing function is a constant hyperparameter. In another embodiment, the mixing function is a learnable similarity function, i.e. a similarity function in which the precise metrics that defines this similarity is learned from the data.

In an embodiment, the mixing function is defined by $g(u, i, j; \theta_g)=\sigma(\vec{\imath}^T \cdot W_g \cdot \vec{\jmath})$ where $\sigma$ is the sigmoid function $$\left(\sigma(x) = \frac{1}{1+e^{-x}}\right),$$

and $\vec{\imath}$ and $\vec{\jmath}$ are the embeddings of items i and j, respectively.

In an embodiment, $W_g$ is a k*k symmetric positive semi-definite matrix: $W_g=V_g^T V_g$ with $V_g$ a k'*k matrix of rank $(V_g)=k'>>k$, as defined above. Typical orders of magnitude or values for k and k' have already been given above. In that case, the mixing function g can be interpreted as a generalized similarity measure between items i and j, where the metrics is learned from the data. In further embodiments, more complex models are considered, such as a model taking into account the ranks of i and j or a model using more than one (linear) layer, provided that their complexity is compatible with the size and the distribution of the training data.

In an embodiment, $V_g = \theta_g$, that is $W_g = \theta_g^T \theta_g$, where the second set of learnable parameters $\theta_g$ is a matrix of dimension k'*k. In other embodiments, $V_g$ can be defined as a more complex function of $\theta_g$.

In an alternative embodiment, $W_g = \text{diag}(\theta_g)$, where the second set of learnable parameters $\theta_g$ is a vector of dimension k and $W_g$ is a diagonal matrix whose diagonal is given by $\theta_g$ and whose other values are zero.

In the general case, a purely Content-Based setting is considered (where the attributes and the content of the items and of the entities are taken into account, as discussed above).

In this embodiment, a learnable entity embedding function $e_U$ is used, that maps entity features into a more powerful representation: $\vec{u} = e_U(x_u; \theta_1)$, as well as a learnable item embedding function $e_I$ that maps item features into the same space as the entity features: the item embeddings are thus defined by $\vec{\iota} = e_I(x_i; \theta_2)$ and $\vec{J} = e_I(x_j; \theta_2)$, where $\theta_1$ and $\theta_2$ are learnable parameters. These functions can take the form of simple linear transforms or deep neural networks.

In a more restrictive embodiment, compatible with all the definitions of g given above, a purely Collaborative-Filtering setting is considered (in which only the interactions of the entities with the items are taken into account, while the attributes and the content of the items and the entities are ignored, as discussed above)

In this embodiment, the only available data consists of a sparse interaction matrix R, encoding the rating or the click action of all the entities for all the items. In this embodiment, the embeddings of an entity u and an item i (or j) are derived from the decomposition of the matrix R into two low rank matrices. Alternatively, these embeddings are obtained as output of two neural networks (e.g. multi-layer perceptrons), when using deep matrix factorization models.

Unless explicitly defined as alternative embodiments, any combination of the embodiments described above for defining the mixing function, the embeddings, and the matrix $W_g$ can be utilized.

At steps 206 and 208, a first relevance score $f(u, j; \theta)$ and a second relevance score $f(u, i; \theta)$ are computed by applying the learnable scoring function $f$ to the entity u, and to the items j and i, respectively. In an embodiment, the relevance score for an item i is given by $f(u, i; \theta) = \vec{u}^T \cdot \vec{\iota}$. In another embodiment, the relevance score for an item i is also given by a bilinear form (similar to the one used for the mixing function in the embodiments described above in relation with step 204) $f(u, i; \theta) = \vec{u}^T \cdot W \cdot \vec{\iota}$, where W is a k*k symmetric positive semi-definite matrix and k is the dimension of the embeddings $\vec{u}$ and $\vec{\iota}$.

In an embodiment, $W = \theta^T \theta$, where the first set of learnable parameters $\theta$ is a matrix of dimension k'*k, where k' is one or more orders of magnitude lower than k. In an alternative embodiment, $W = \text{diag}(\theta)$, where $\theta$ is a vector of dimension k and W is a diagonal matrix whose diagonal is given by $\theta$ and whose other values are zero.

More generally, in a formulation that encompasses the above alternative embodiments, the learnable scoring function is given by $f(u, i; \theta) = \text{Matching}(e_U(x_u; \theta_1), e_I(x_i; \theta_2))$, where $e_U$ is a learnable entity embedding function that maps entity features $x_u$ into an entity embedding $\vec{u} = e_U(x_u; \theta_1)$, $e_I$ is a learnable item embedding function that maps item features $x_i$ into an item embedding $\vec{\iota} = e_I(x_i; \theta_2)$, and $\theta_1$ and $\theta_2$ are learnable parameters.

The Matching function acts as a similarity measure between the entity embedding and the item embedding that outputs a relevance score for the item corresponding to the item embedding. In an embodiment, this similarity measure increases with the relevance of the item for the entity corresponding to the entity embedding.

In the general case, compatible with all the definitions of $f$ given above, where a purely Content-Based setting is considered, the embeddings are defined by $\vec{\iota} = e_I(x_i; \theta_2)$ and $\vec{J} = e_I(x_j; \theta_2)$, as described above in relation with the computation of the mixing function in the Content-Based setting embodiment in step 204.

In the more restrictive embodiment, also compatible with all the definitions of $f$ given above, where a purely Collaborative-Filtering setting is considered, the embeddings $\vec{u}$ and $\vec{\iota}$ are derived from the decomposition of the sparse interaction matrix R into two low rank matrices, as described above in relation with the computation of the mixing function in the Collaborative-Filtering setting embodiment in step 204.

At step 210, the weighting coefficient $g(u, i, j; \theta_g)$ computed at step 204 is applied to the first relevance score $f(u, j; \theta)$ computed at step 206. In an embodiment, the first relevance score $f(u, j; \theta)$ computed at step 206 is multiplied (or "weighted") by the weighting coefficient $g(u, i, j; \theta)$ computed at step 204.

At step 212, the (estimated) probability of having the item i preferred to the item j by the entity u is computed as a function of a difference between the second relevance score and the weighted first relevance score. In an embodiment, this probability is computed as:

$$p(i > j | u) = \sigma(f(u, i; \theta) - g(u, i, j; \theta_g) \cdot f(u, j; \theta))$$

where $\sigma$ is the sigmoid function.

At step 214, it is determined whether there is a remaining triplet <u, i, j> in the set. If it is the case, the previous steps 202 to 212 are repeated for the next triplet, in order to compute the probability of having the item i preferred to the item j by the entity u (as computed at step 212) for each triplet of the set.

Otherwise, the method continues at step 216, at which the known technique of gradient descent optimization is used to gradually optimize the values of the first and second sets of learnable parameters $\theta$ and $\theta_g$, as mentioned above. This gradual optimization takes place over a plurality of iterations on the previous steps 202 to 216 (not shown), until these parameters reach their optimized values. This happens when the loss function used for the gradient descent optimization converges towards its optimum value.

In an embodiment, the loss function is a negative log-likelihood loss function and optimizing the loss function comprises minimizing the loss function over the training set of entities and items. An exemplary loss function corresponding to this embodiment has been given above. However, in alternative embodiments, the loss function can be redefined to converge to a maximum value.

Finally, when the loss function has reached its optimum, the optimized values of the first and second sets of parameters $\theta$ and $\theta_g$ are obtained, and the training phase of step 102 of FIG. 1 ends at step 218 of FIG. 2.

It is noted that the order and the number of the steps of FIG. 2 are merely illustrative. The order and the number of the steps of FIG. 2 are not meant to be restrictive and all the alternative embodiments that a skilled person would consider in order to implement the same general idea are also contemplated without departing from the scope of the present disclosure.

For example, the loop performed on the input triplets, or the computation in steps 204 to 210 of the different terms necessary to compute the probability in step 212 can be implemented according to any alternative formulation or ordering that would fall within the usual skills of a person skilled in the art.

In the following discussion, a user may be any user, context, or user query or "entity" as defined above. The above concepts are now exemplarily applied to a news recommendation use case, where items are news articles.

A purely Content-Based approach is adopted for solving this recommendation problem: item features consist of an unsupervised embedding of the bag of words of the news' content, while user features are derived from previous interactions with the system.

A user's action history at time t with N interactions is denoted as $S_t^u = (I_1^u, I_2^u, \ldots, I_N^u)$. Each interaction of user u consists of user's (implicit) feedback on a list of K recommended items. This interaction is defined by the list $I^u = ((i_1, y_{u,i_1}), \ldots, (i_k, y_{u,i_k}), \ldots, (i_K, y_{u,i_K}))$ which contains clicked ($y_{u,i_k}=1$) and non-clicked ($y_{u,i_k}=0$) items from a list of K recommended items.

A user is represented by an embedding derived from previous interactions (clicked and not clicked items) in the following way:

$$\vec{u}_t = \mu_{u_t}^+ - \beta \odot \mu_{u_t}^-$$

$$\mu_{u_t}^+ = \frac{1}{|\{i \mid y_{u,i} = 1\}|} \sum_{\{i \mid y_{u,i}=1\}} e_I(x_i; \theta_2)$$

$$\mu_{u_t}^- = \frac{1}{|\{i \mid y_{u,i} = 0\}|} \sum_{\{i \mid y_{u,i}=0\}} e_I(x_i; \theta_2)$$

where $\mu_{u_t}^+$ is a vector of dimension k defined by the mean of the user u's clicked items' embeddings at time t (user positive centroid) and $\mu_{u_t}^-$, is a vector of dimension k defined by the mean of the user u's non-clicked items' embeddings at time t (user negative centroid). β is a vector of learnable parameters of dimension k that quantifies to which extent the non-clicked items are useful to characterize user preferences (i.e., β scales the user negative centroid), and ⊙ denotes the element-wise product of two vectors. The notation of time t is dropped when it is clear in the context. It is assumed, in these equations, that $\|e_I(x_i; \theta_2)\|=1$ for all i.

The learnable scoring function of an item i for a user u, is defined by a simple bilinear form:

$$f(u,i;\theta) = \vec{i}^T W \vec{u}$$

by using a diagonal weight matrix $W=\text{diag}(\theta)$, where θ is a vector of dimension k. This amounts to consider a generalized dot product between the user's and the item's representation, where the scaling factor (or weight) for each dimension is learned from the data. At the beginning of the training phase, θ is initialized to 1 (i.e., more precisely, to a vector of dimension k with all its values being initialized to 1).

In this exemplary implementation, the mixing function $g(u, i, j; \theta_g)$ is defined as being the sigmoid of a bilinear form:

$$g(u,i,j;\theta_g) = \sigma(\vec{i}^T W_g \vec{j})$$

where $W_g = \text{diag}(\theta_g)$ is a diagonal weight matrix, where $\theta_g$ is a vector of dimension k. This amounts to consider a generalized dot product between the representations of the two items, but where the scaling factors (or weights) are also learned from the data and could be different from the relevance score function parameters defined by the vector θ. At the beginning of the training phase, $\theta_g$ is initialized to 1 (i.e., more precisely, to a vector of dimension k with all its values being initialized to 1).

AIRS news dataset consists of different genres of Korean news: entertainment, sports, and general. For each news category, users' news reading activity logs for 7 days are available. User news reading activities are composed of news article impressions and clicks to recommended news. Recommended news article list is composed of twenty-eight news for entertainment and sports news, and eight for general news. For the experimental setup, the users' activities taken into account have been restricted to the impressions with click information.

News article texts were lemmatized by using the KoNLPy toolkit, and lemmas appearing less than three times were discarded. In computational linguistics, lemmatization is the algorithmic process of determining the lemma of a word based on its intended meaning, the lemma being the canonical form common to a set of words having the same meaning. Segmentation of words was not needed, since the news articles are composed of words separated by blank spaces.

After preprocessing, the resulting vocabulary size is 40,000 for entertainment news, 30,000 for sports news, and 61,000 for general news.

The data is separated to train, validation and test set by temporal order: The first three days form the training set, the fourth day forms the validation set, and the last three days form the test set. The experiments are repeated for each model five times, each run is randomly initialized with a predefined seed specific to this run. For each run 1000 users are selected at random (with the predefined seed initialization of this specific run). It is ensured that each user has at least one click on the first four days (train and validation sets), and at least one click on the last three days (test set).

The ranking approach described above in this disclosure is compared with pointwise, pairwise, and listwise ranking approaches. The model parameters are optimized through stochastic back-propagation with an adaptive learning rate for each parameter with the binary cross entropy loss on the output. The mini-batch size (i.e. the number of instances used for calculating weight update at each iteration) is chosen to be 128.

For regularization, $L_2$ norm normalization (weight decay) and batch normalization are applied (where the L2 norm is the square of a weight parameter, and batch normalization normalizes the input layer by adjusting and scaling the activations).

For hyperparameter tuning (i.e. the process of finding the values of the hyperparameters λ, plus the constant γ in the embodiment mentioned above where the mixing function is chosen to be a constant hyper-parameter), a grid search over the learning rate values of $\{10^{-2}, 10^{-3}, 10^{-4}\}$ has been used, together with the regularization coefficient values of $\{10^{-3}, 10^{-4}, 10^{-5}, 10^{-6}\}$.

The hyperparameter values are automatically chosen, the chosen hyperparameter setting being the one which leads to the best average normalized Discounted Cumulative Gain (NDCG) score of five runs on the validation set. The NDCG is a ranking measure that penalizes highly relevant documents appearing lower in a search result list, the penalty applied to these documents being logarithmically proportional to the position of the document in the search result list.

The respective ranking performances of the proposed ranking approach (according to the experimental setting described above) and baseline ranking approaches are now assessed in terms of hit ratio (HR), being the ratio of the number of clicks on an item over the total number of clicks in the test data, NDCG (defined above), and mean Reciprocal Rank (MRR), being the mean of the multiplicative inverse of the rank of the first clicked item.

The average score of five runs and the standard deviation on the test set are reported in terms of these ranking measures to obtain a better generalization estimate of the ranking performances. Furthermore, the statistical significance of the results is assessed by using Wilcoxon signed-rank test (a non-parametric paired difference test) with Bonferroni correction (which is used to adjust confidence intervals to counteract the problem of multiple comparisons). The recommendation list length (i.e., how many documents are recommended to the user in the list of recommendations obtained as output of the models) for each model is given after a "@" in Tables 1, 2 and 3, as illustrated in FIG. 4-6

The proposed ranking model is then compared with pointwise, pairwise, and listwise ranking models on the AIRS news dataset. The results for personalized news recommendation on AIRS entertainment news are shown in Table 1 (FIG. 4), and the results for personalized news recommendation results on AIRS sports and general news are shown in Table 2 (FIG. 5).

Table 3 (FIG. 6) shows general results for all types of news on the AIRS news dataset. The best scores are shown in bold, and the baseline model score is shown with "*", when the best model (in bold) is significantly better than the baseline model with 5%, and "**" with 1%. 5% and 1% thresholds are corrected by using Bonferroni correction.

As illustrated in FIG. 4, Table 1 shows the results on AIRS entertainment news. The best results (maximum) are in bold. "*" indicates that a model is significantly worse than the best method according to a Wilcoxon signed-rank test using Bonferroni correction with 5% and "**" with 1%.

More specifically, Table 1 shows the personalized news recommendation results on AIRS entertainment news dataset in terms of HR@1, NDCG@8, NDCG@28, and MRR@28 scores. Adaptive pointwise-pairwise g ranking on entertainment dataset significantly improves over pointwise, pairwise, and listwise ranking in terms of HR@1, and adaptive pointwise-pairwise g significantly improves over all other ranking approaches in terms of NDCG@8, NDCG@28, and MRR@28. The pairwise ranking leads to the lowest HR, NDCG, and MRR scores on AIRS entertainment news.

As illustrated in FIG. 5, Table 2 shows the results on AIRS sports news. The best results (maximum) are in bold. "*" indicates that a model is significantly worse than the best method according to a Wilcoxon signed-rank test using Bonferroni correction with 5% and "**" with 1%.

More specifically, Table 2 illustrates personalized news recommendation performances of different ranking approaches on AIRS sports news dataset. Similarly to what was observed in Table 1, on sports news recommendation dataset adaptive pointwise-pairwise g achieves the highest HR@1, NDCG@8, NDCG@28, and MRR@28 scores. Adaptive pointwise-pairwise g achieves significantly better results than pointwise, pairwise, and listwise ranking in terms of NDCG@8, NDCG@28, and MRR@28, and it also achieves significantly better results than pairwise and listwise ranking in terms of HR@1. The pointwise ranking model is the leading model among other baseline ranking approaches, and it is followed by pairwise and listwise ranking, respectively.

As illustrated in FIG. 6, Table 3 shows the results on AIRS general news. The best results (maximum) are in bold. "*" indicates that a model is significantly worse than the best method according to a Wilcoxon signed-rank test using Bonferroni correction with 5% and "**" with 1%.

More specifically, Table 3 gives the personalized news recommendation results of adaptive pointwise-pairwise and baseline ranking approaches on AIRS general news. Adaptive pointwise-pairwise g ranking leads to the best scores in terms of HR@1, NDCG@8, and MRR@8 (the recommendation list length is 8 for general news), that are significantly better than the rest of the ranking approaches.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry like e.g. a processor communicating with a memory, the means being configured to, or adapted to, perform one of the methods described herein.

A further embodiment comprises a computer having installed thereon the computer program or instructions for performing one of the methods described herein.

The above-mentioned methods and embodiments may be implemented within an architecture such as illustrated in FIG. 3, which comprises server 300 and one or more client devices 302 that communicate over a network 304 (which may be wireless and/or wired) such as the Internet for data exchange. Server 300 and the client devices 302 include a data processor 312 and memory 313 such as a hard disk. The client devices 302 may be any device that communicates with server 300, including autonomous vehicle 302b, robot 302c, computer 302d, or cell phone 302e.

More specifically, in one embodiment, a user of the client device 302 requests (or is automatically provided with) a list of recommendations as output of the ranking method described above in relation with FIG. 1. The training phase (step 102 of FIG. 1) as well as the appliance of the trained learnable scoring function to answer the request (step 104 of FIG. 1) may be processed at server 300 (or at a different server or alternatively directly at the client device 302), and a resulting list of recommended items is sent back to the client device 302, where it can be displayed or provided to the user on any other way.

It is finally noted that in an embodiment compatible with all the embodiments described above, the methods described in relation with FIGS. 1 and 2 can be used to automatically control any client device like the client devices 302, including e.g. autonomous vehicle 302b, robot 302c, computer 302d, or cell phone 302e, among other types of client devices known in the field.

As described above, a computer-implemented method of constructing a ranking model for an information retrieval system by ranking items for a given entity with a learnable scoring function, wherein an entity is one of a user, a query, or a context, the method comprises (a) training a learnable scoring function $f$, which depends on a first set of learnable parameters $\theta$ and on a set of triplets <u, i, j>, the set of triplets comprising an entity u from a set of entities and a pair of items i and j from a set of items, wherein a relative relevance of each pair of items i and j from the set of items for each entity u from the set of entities is known, to learn optimized values of the first set of learnable parameters $\theta$; the training the learnable scoring function $f$ including (a1) optimizing a loss function depending on the first set of learnable parameters $\theta$ and on a second set of learnable parameters $\theta_g$, wherein the loss function defines a continuum between pointwise ranking and pairwise ranking of items through its dependency on a learnable mixing function g depending on $\theta_g$; (b) applying, using the learned optimized values of the first set of learnable parameters $\theta$, the trained learnable scoring function $f$ to all input pairs <u', i'> formed by a given entity u' from the set of entities and by every item i' from the set of items to obtain a relevance score for each pair; (c) ranking the items i' for the entity u' based on the respective relevance scores; and (d) constructing, using the ranked the items i' for the entity u', a ranking model for an information retrieval system.

The training the learnable scoring function $f$, may further comprise: (a2) computing, for each triplet <u, i, j> of the set of triplets, a weighting coefficient $g(u, i, j; \theta_g) \in [0,1]$ by applying the learnable mixing function g to the entity u, the two items i and j, and the second set of learnable parameters $\theta_g$; (a3) computing, for each triplet <u, i, j> of the set of triplets, a first relevance score $f(u, j; \theta)$ defining a relevance of the item j for the entity u, by applying the learnable scoring function $f$ to the item j and the entity u; (a4) computing, for each triplet <u, i, j> of the set of triplets, a second relevance score $f(u, i; \theta)$ defining a relevance of the item i for the entity u, by applying the learnable scoring function $f$ to the item i and the entity u; (a5) applying, for each triplet <u, i, j> of the set of triplets, the weighting coefficient $g(u, i, j; \theta_g)$ to the first relevance score $f(u, j; \theta)$; (a6) computing, for each triplet <u, i, j> of the set of triplets, a probability of having the item i preferred to the item j by the entity u as a function of a difference between the second relevance score $f(u, i; \theta)$ and the weighted first relevance score, wherein the computed probability corresponds to a pairwise relevance probability of having the item i preferred to the item j by the entity u if $g(u, i, j; \theta_g)=1$, to a pointwise relevance probability defining how relevant the item i is to the entity u if $g(u, i, j; \theta_g)=0$, and defines the continuum between pointwise ranking and pairwise ranking of items if $0<g(u, i, j; \theta_g)<1$; and (a7) learning optimized values of the first and second sets of learnable parameters $\theta$ and $\theta_g$ by optimizing the loss function, depending on $\theta$ and $\theta_g$, through gradient descent optimization, the loss function being defined as a sum over all triplets <u, i, j> of a function derived from the probability of having the item i preferred to the item j by the entity u.

The function of the difference between the second relevance score and the weighted first relevance score may be a sigmoid function.

The loss function may be a negative log-likelihood loss function and optimizing the loss function may minimize the loss function over the set of entities and the set of items.

The negative log-likelihood loss function may be defined by:

$$L_{adaptive}(\theta, \theta_g) = - \sum_{(u,i,j) \in D} (y_{u,i>j} \log \sigma(f(u, i; \theta) - g(u, i, j; \theta_g) f(u, j; \theta)) +$$
$$(1 - y_{u,i>j}) \log(1 - \sigma(f(u, i; \theta) - g(u, i, j; \theta_g) f(u, j; \theta)))),$$

wherein D is the set of triplets <u, i, j>, $\sigma$ is the sigmoid function, $f(u, i; \theta)$ is the learnable scoring function that assigns a relevance score to the item i for the entity u, and $y_{u,i>j}$ is a variable defined by $y_{u,i>j}=1$ when entity u prefers item i over j, and $y_{u,i>j}=0$ otherwise.

The learnable scoring function may be given by $f(u, i; \theta)$=Matching($e_U(x_u; \theta_1), e_I(x_i; \theta_2)$), where $e_U$ is a learnable entity embedding function that maps entity features $x_u$ into an entity embedding $\vec{u}=e_U(x_u; \theta_1)$ and $e_I$ is a learnable item embedding function that maps item features $x_i$ into an item embedding $\vec{\imath}=e_I(x_i; \theta_2)$, where $\theta_1$ and $\theta_2$ are learnable parameters, and where the Matching function acts as a similarity measure between the entity embedding and the item embedding that outputs a relevance score for the item corresponding to the item embedding, wherein the relevance score increases with the relevance of the item for the entity corresponding to the entity embedding.

The learnable scoring may be given by $f(u, i; \theta) = \vec{u}^T \cdot \vec{\imath}$.

The learnable scoring function may be given by $f(u, i; \theta) = \vec{u}^T \cdot W \cdot \vec{\imath}$; wherein $W=\theta^T \theta$ is a k*k symmetric positive semi-definite matrix; k is the dimension of the embeddings $\vec{u}$ and $\vec{\imath}$; the first set of learnable parameters $\theta$ is a matrix of dimension k'*k; and k' is an integer one or more orders of magnitude lower than k.

The learnable scoring function may be given by $f(u, i; \theta) = \vec{u}^T \cdot W \cdot \vec{\imath}$; wherein W=diag ($\theta$) is a k*k diagonal matrix whose diagonal is given by $\theta$ and whose other values are zero; k is the dimension of the embeddings $\vec{u}$ and $\vec{\imath}$; and the first set of learnable parameters $\theta$ is a vector of dimension k.

Under a Collaborative-Filtering setting making use only of entity-item interactions, the only available data for computing $\vec{u}$ and $\vec{\imath}$ may consist of a sparse interaction matrix R encoding a rating or a click action of an entity u for an item i.

The learnable mixing function g may be a learnable similarity function.

The learnable mixing function g may be a constant hyper-parameter.

The learnable mixing function may be defined by $g(u, i, j; \theta_g) = \sigma(\vec{\imath}^T \cdot W_g \cdot \vec{\jmath})$, where $\vec{\imath}$ and $\vec{\jmath}$ are the embeddings of items i and j, respectively, $\sigma$ is a sigmoid function, $W_g = \theta_g^T \theta_g$ is a k*k symmetric positive semi-definite matrix, k is the dimension of the embeddings $\vec{\imath}$ and $\vec{\jmath}$, the second set of learnable parameters $\theta_g$ is a matrix of dimension k'*k, and k' is an integer one or more orders of magnitude lower than k.

The learnable mixing function may be defined by $g(u, i, j; \theta_g) = \sigma(\vec{\imath}^T \cdot W_g \cdot \vec{\jmath})$, where $\vec{\imath}$ and $\vec{\jmath}$ are the embeddings of items i and j, respectively, $\sigma$ is a sigmoid function, and $W_g = \text{diag}(\theta_g)$ is a k*k diagonal matrix whose diagonal is given by $\theta_g$ and whose other values are zero, k is the dimension of the embeddings $\vec{u}$ and $\vec{\imath}$, and the second set of learnable parameters $\theta_g$ is a vector of dimension k.

The entity embedding at time t may be given by $\vec{u}_t = \mu_{u_t}^+ - \beta \odot \mu_{u_t}^-$, wherein $\mu_{u_t}^+$ is the mean of the embeddings of the items clicked by the entity u up to time t and $\mu_{u_t}^-$ is the mean of the embeddings of the items non-clicked by the entity u up to time t over a list of K items recommended to the entity, $\beta$ is a vector of learnable parameters of dimension k that quantifies to which extent the non-clicked items are useful to characterize entity preferences, and $\odot$ is the element-wise product of two vectors.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A computer-implemented method of ranking items for a given entity with a learnable scoring function, wherein an entity is one of a user, a query, or a context, the method comprising:
   (a) training a learnable scoring function $f$, which depends on a first set of learnable parameters $\theta$, on a set of triplets <u, i, j> each comprising an entity u from a set of entities and a pair of items i and j from a set of items with associated user based feedback, wherein a relative relevance of each pair of items i and j from the set of items for each entity u from the set of entities is known using the user based feedback;
   said training the learnable scoring function $f$ including
      (a1) optimizing a loss function depending on the first set of learnable parameters $\theta$ and on a second set of learnable parameters $\theta_g$, to learn optimized values of the first and second sets of learnable parameters $\theta$ and $\theta_g$, wherein the loss function defines a continuum between pointwise ranking and pairwise ranking of items through its dependency on a learnable mixing function g depending on $\theta_g$ and varying depending on the triplet <u, i, j> of the set of triplets;
   (b) applying, using the learned optimized values of the first set of learnable parameters $\theta$, the trained learnable scoring function $f$ to all input pairs <u', i'> formed by a given entity u' from the set of entities and by every item i' from the set of items to obtain a relevance score for each pair;
   (c) ranking the items i' for the entity u' based on the respective relevance scores; and
   (d) outputting results of the ranking to a client device.

2. The method as claimed in claim 1, wherein said training the learnable scoring function $f$, further comprises:
   (a2) computing, for each triplet <u, i, j> of the set of triplets, a weighting coefficient $g(u, i, j; \theta_g) \in [0,1]$ by applying the learnable mixing function g to the entity u, the two items i and j, and the second set of learnable parameters $\theta_g$;
   (a4) computing, for each triplet <u, i, j> of the set of triplets, a first relevance score $f(u, j; \theta)$ defining a relevance of the item j for the entity u, by applying the learnable scoring function $f$ to the item j and the entity u;
   (a4) computing, for each triplet <u, i, j> of the set of triplets, a second relevance score $f(u, i; \theta)$ defining a relevance of the item i for the entity u, by applying the learnable scoring function $f$ to the item i and the entity u;
   (a5) applying, for each triplet <u, i, j> of the set of triplets, the weighting coefficient $g(u, i, j; \theta_g)$ to the first relevance score $f(u, j; \theta)$
   (a6) computing, for each triplet <u, i, j> of the set of triplets, a probability of having the item i preferred to the item j by the entity u as a function of a difference between the second relevance score $f(u, i; \theta)$ and the weighted first relevance score, wherein the computed probability corresponds to a pairwise relevance probability of having the item i preferred to the item j by the entity u if $g(u, i, j; \theta_g)=1$, to a pointwise relevance probability defining how relevant the item i is to the entity u if $g(u, i, j; \theta_g)=0$, and defines said continuum between pointwise ranking and pairwise ranking of items if $0 < g(u, i, j; \theta_g) < 1$; and
   (a7) learning optimized values of the first and second sets of learnable parameters $\theta$ and $\theta_g$ by optimizing the loss function, depending on $\theta$ and $\theta_g$, through gradient descent optimization, the loss function being defined as a sum over all triplets <u, i, j> of a function derived from the probability of having the item i preferred to the item j by the entity u.

3. The method as claimed in claim 2, wherein the function of the difference between the second relevance score and the weighted first relevance score is a sigmoid function.

4. The method as claimed in claim 2, wherein the loss function is a negative log-likelihood loss function and optimizing the loss function minimizes the loss function over the set of entities and the set of items.

5. The method as claimed in claim 4, wherein the negative log-likelihood loss function is defined by:

$$L_{adaptive}(\theta, \theta_g) = - \sum_{(u,i,j) \in D} (y_{u,i>j} \log \sigma(f(u, i; \theta) - g(u, i, j; \theta_g) f(u, j; \theta)) + (1 - y_{u,i>j}) \log(1 - \sigma(f(u, i; \theta) - g(u, i, j; \theta_g) f(u, j; \theta)))),$$

wherein D is the set of triplets <u, i, j>, $\sigma$ is the sigmoid function, $f(u, i; \theta)$ is the learnable scoring function that assigns a relevance score to the item i for the entity u, and $y_{u,i>j}$ is a variable defined by $y_{u,i>j}=1$ when entity u prefers item i over j, and $y_{u,i>j}=0$ otherwise.

6. The method as claimed in claim 4, wherein the learnable scoring function is given by $f(u, i; \theta) = \text{Matching}(e_U(x_u; \theta_1), e_I(x_i; \theta_2))$, where $e_U$ is a learnable entity embedding function that maps entity features $x_u$ into an entity embedding $\vec{u} = e_U(x_u; \theta_1)$ and $e_I$ is a learnable item embedding function that maps item features $x_i$ into an item embedding $\vec{\iota} = e_I(x_i; \theta_2)$, where $\theta_1$ and $\theta_2$ are learnable parameters, and where the Matching function acts as a similarity measure between the entity embedding and the item embedding that outputs a relevance score for the item corresponding to the item embedding, wherein the relevance score increases with the relevance of the item for the entity corresponding to the entity embedding.

7. The method as claimed in claim 2, wherein the learnable scoring function is given by $f(u, i; \theta) = \text{Matching}(e_U(x_u; \theta_1), e_I(x_i; \theta_2))$, where $e_U$ is a learnable entity embedding function that maps entity features $x_u$ into an entity embedding $\vec{u} = e_U(x_u; \theta_1)$ and $e_I$ is a learnable item embedding function that maps item features $x_i$ into an item embedding $\vec{\iota} = e_I(x_i; \theta_2)$, where $\theta_1$ and $\theta_2$ are learnable parameters, and where the Matching function acts as a similarity measure between the entity embedding and the item embedding that outputs a relevance score for the item corresponding to the item embedding, wherein the relevance score increases with the relevance of the item for the entity corresponding to the entity embedding.

8. The method as claimed in claim 2, wherein the learnable mixing function g is a learnable similarity function.

9. The method as claimed in claim 2, wherein the learnable mixing function is defined by $g(u, i, j; \theta_g) = \sigma(\vec{\iota}^T \cdot W_g \cdot \vec{J})$, where $\vec{\iota}$ and $\vec{J}$ are the embeddings of items i and j, respectively, $\sigma$ is a sigmoid function, $W_g = \theta_g^T \theta_g$ is a k*k symmetric positive semi-definite matrix, k is the dimension of the embeddings $\vec{\iota}$ and $\vec{J}$, the second set of learnable parameters $\theta_g$ is a matrix of dimension k'*k, and k' is an integer one or more orders of magnitude lower than k.

10. The method as claimed in claim 2, wherein the learnable mixing function is defined by $g(u, i, j; \theta_g) = \sigma(\vec{\iota}^T \cdot W_g \cdot \vec{J})$, where $\vec{\iota}$ and $\vec{J}$ are the embeddings of items i and j, respectively, $\sigma$ is a sigmoid function, and $W_g = \text{diag}(\theta_g)$ is a k*k diagonal matrix whose diagonal is given by $\theta_g$ and whose other values are zero, k is the dimension of the embeddings $\vec{u}$ and $\vec{\iota}$, and the second set of learnable parameters $\theta_g$ is a vector of dimension k.

11. The method as claimed in claim 1, wherein the loss function is a negative log-likelihood loss function and optimizing the loss function minimizes the loss function over the set of entities and the set of items.

12. The method as claimed in claim 11, wherein the negative log-likelihood loss function is defined by:

$$L_{adaptive}(\theta, \theta_g) = - \sum_{(u,i,j) \in D} (y_{u,i>j} \log \sigma(f(u, i; \theta) - g(u, i, j; \theta_g) f(u, j; \theta)) + (1 - y_{u,i>j}) \log(1 - \sigma(f(u, i; \theta) - g(u, i, j; \theta_g) f(u, j; \theta)))),$$

wherein D is the set of triplets <u, i, j>, $\sigma$ is the sigmoid function, $f(u, i; \theta)$ is the learnable scoring function that assigns a relevance score to the item i for the entity u, and $y_{u,i>j}$ is a variable defined by $y_{u,i>j} = 1$ when entity u prefers item i over j, and $y_{u,i>j} = 0$ otherwise.

13. The method as claimed in claim 12, wherein the learnable mixing function g is a learnable similarity function.

14. The method as claimed in claim 12, wherein the learnable mixing function is defined by $g(u, i, j; \theta_g) = \sigma(\vec{\iota}^T \cdot W_g \cdot \vec{J})$, where $\vec{\iota}$ and $\vec{J}$ are the embeddings of items i and j, respectively, $\sigma$ is a sigmoid function, $W_g = \theta_g^T \theta_g$ is a k*k symmetric positive semi-definite matrix, k is the dimension of the embeddings $\vec{\iota}$ and $\vec{J}$, the second set of learnable parameters $\theta_g$ is a matrix of dimension k'*k, and k' is an integer one or more orders of magnitude lower than k.

15. The method as claimed in claim 12, wherein the learnable mixing function is defined by $g(u, i, j; \theta_g) = \sigma(\vec{\iota}^T \cdot W_g \cdot \vec{J})$, where $\vec{\iota}$ and $\vec{J}$ are the embeddings of items i and j, respectively, $\sigma$ is a sigmoid function, and $W_g = \text{diag}(\theta_g)$ is a k*k diagonal matrix whose diagonal is given by $\theta_g$ and whose other values are zero, k is the dimension of the embeddings $\vec{u}$ and $\vec{\iota}$, and the second set of learnable parameters $\theta_g$ is a vector of dimension k.

16. The method as claimed in claim 11, wherein the learnable scoring function is given by $f(u, i; \theta) = \text{Matching}(e_U(x_u; \theta_1), e_I(x_i; \theta_2))$, where $e_U$ is a learnable entity embedding function that maps entity features $x_u$ into an entity embedding $\vec{u} = e_U(x_u; \theta_1)$ and $e_I$ is a learnable item embedding function that maps item features $x_i$ into an item embedding $\vec{\iota} = e_I(x_i; \theta_2)$, where $\theta_1$ and $\theta_2$ are learnable parameters, and where the Matching function acts as a similarity measure between the entity embedding and the item embedding that outputs a relevance score for the item corresponding to the item embedding, wherein the relevance score increases with the relevance of the item for the entity corresponding to the entity embedding.

17. The method as claimed in claim 11, wherein the learnable mixing function g is a learnable similarity function.

18. The method as claimed in claim 11, wherein the learnable mixing function is defined by $g(u, i, j; \theta_g) = \sigma(\vec{\iota}^T \cdot W_g \cdot \vec{J})$, where $\vec{\iota}$ and $\vec{J}$ are the embeddings of items i and j, respectively, $\sigma$ is a sigmoid function, $W_g = \theta_g^T \theta_g$ is a k*k symmetric positive semi-definite matrix, k is the dimension of the embeddings $\vec{\iota}$ and $\vec{J}$, the second set of learnable parameters $\theta_g$ is a matrix of dimension k'*k, and k' is an integer one or more orders of magnitude lower than k.

19. The method as claimed in claim 11, wherein the learnable mixing function is defined by $g(u, i, j; \theta_g) = \sigma(\vec{\iota}^T \cdot W_g \cdot \vec{J})$, where $\vec{\iota}$ and $\vec{J}$ are the embeddings of items i and j, respectively, $\sigma$ is a sigmoid function, and $W_g = \text{diag}(\theta_g)$ is a k*k diagonal matrix whose diagonal is given by $\theta_g$ and whose other values are zero, k is the dimension of the embeddings $\vec{u}$ and $\vec{\iota}$, and the second set of learnable parameters $\theta_g$ is a vector of dimension k.

20. The method as claimed in claim 1, wherein the learnable scoring function is given by $f(u, i; \theta) = \text{Matching}(e_U(x_u; \theta_1), e_I(x_i; \theta_2))$, where $e_U$ is a learnable entity embedding function that maps entity features $x_u$ into an entity embedding $\vec{u} = e_U(x_u; \theta_1)$ and $e_I$ is a learnable item embedding function that maps item features $x_i$ into an item embedding $\vec{\iota} = e_I(x_i; \theta_2)$, where $\theta_1$ and $\theta_2$ are learnable parameters, and where the Matching function acts as a similarity measure between the entity embedding and the item embedding that outputs a relevance score for the item corresponding to the item embedding, wherein the relevance score increases with the relevance of the item for the entity corresponding to the entity embedding.

21. The method as claimed in claim 20, wherein the learnable scoring function is given by $f(u, i; \theta) = \vec{u}^T \cdot \vec{\iota}$.

22. The method as claimed in claim 20, wherein the learnable scoring function is given by $f(u, i; \theta) = \vec{u}^T \cdot W \cdot \vec{\iota}$; $W = \theta^T \theta$ being a k*k symmetric positive semi-definite matrix;

k being the dimension of the embeddings $\vec{u}$ and $\vec{\iota}$;

the first set of learnable parameters e being a matrix of dimension k'*k;

k' being an integer one or more orders of magnitude lower than k.

23. The method as claimed in claim 20, wherein the learnable scoring function is given by $f(u, i; \theta) = \vec{u}^T \cdot W \cdot \vec{\iota}$; $W = \text{diag}(\theta)$ being a k*k diagonal matrix whose diagonal is given by $\theta$ and whose other values are zero;

k being the dimension of the embeddings $\vec{u}$ and $\vec{\iota}$;

the first set of learnable parameters $\theta'$ being a vector of dimension k.

24. The method as claimed in claim 20, wherein under a Collaborative-Filtering setting making use only of entity-item interactions, the only available data for computing $\vec{u}$ and $\vec{\iota}$ consists of a sparse interaction matrix R encoding a rating or a click action of an entity u for an item i.

25. The method as claimed in claim 20, wherein the learnable mixing function g is a learnable similarity function.

26. The method as claimed in claim 20, wherein the learnable mixing function is defined by $g(u, i, j; \theta_g) = \sigma(\vec{\iota}^T \cdot W_g \cdot \vec{j})$, where $\vec{\iota}$ and $\vec{j}$ are the embeddings of items i and j, respectively, $\sigma$ is a sigmoid function, $W_g = \theta_g^T \theta_g$ is a k*k symmetric positive semi-definite matrix, k is the dimension of the embeddings $\vec{\iota}$ and $\vec{j}$, the second set of learnable parameters $\theta_g$ is a matrix of dimension k'*k, and k' is an integer one or more orders of magnitude lower than k.

27. The method as claimed in claim 20, wherein the learnable mixing function is defined by $g(u, i, j; \theta_g) = \sigma(\vec{\iota}^T \cdot W_g \cdot \vec{j})$, where $\vec{\iota}$ and $\vec{j}$ are the embeddings of items i and j, respectively, $\sigma$ is a sigmoid function, and $W_g = \text{diag}(\theta_g)$ is a k*k diagonal matrix whose diagonal is given by $\theta_g$ and whose other values are zero, k is the dimension of the embeddings $\vec{u}$ and $\vec{\iota}$, and the second set of learnable parameters $\theta_g$ is a vector of dimension k.

28. The method as claimed in claim 20, wherein the entity embedding at time t is given by $\vec{u}_t = \mu_{u_t}^+ - \beta \odot \mu_{u_t}^-$, wherein $\mu_{u_t}^+$ is the mean of the embeddings of the items clicked by the entity u up to time t and $\mu_{u_t}^-$ is the mean of the embeddings of the items non-clicked by the entity u up to time t over a list of K items recommended to the entity, $\beta$ is a vector of learnable parameters of dimension k that quantifies to which extent the non-clicked items are useful to characterize entity preferences, and $\odot$ is the element-wise product of two vectors.

29. The method as claimed in claim 1, wherein the learnable mixing function g is a learnable similarity function.

30. The method as claimed in claim 1, wherein the learnable mixing function is defined by $g(u, i, j; \theta_g) = \sigma(\vec{\iota}^T \cdot W_g \cdot \vec{j})$, where $\vec{\iota}$ and $\vec{j}$ are the embeddings of items i and j, respectively, $\sigma$ is a sigmoid function, $W_g = \theta_g^T \theta_g$ is a k*k symmetric positive semi-definite matrix, k is the dimension of the embeddings $\vec{\iota}$ and $\vec{j}$, the second set of learnable parameters $\theta_g$ is a matrix of dimension k'*k, and k' is an integer one or more orders of magnitude lower than k.

31. The method as claimed in claim 1, wherein the learnable mixing function is defined by $g(u, i, j; \theta_g) = \sigma(\vec{\iota}^T \cdot W_g \cdot \vec{j})$, where $\vec{\iota}$ and $\vec{j}$ are the embeddings of items i and j, respectively, $\sigma$ is a sigmoid function, and $W_g = \text{diag}(\theta_g)$ is a k*k diagonal matrix whose diagonal is given by $\theta_g$ and whose other values are zero, k is the dimension of the embeddings $\vec{u}$ and $\vec{\iota}$, and the second set of learnable parameters $\theta_g$ is a vector of dimension k.

* * * * *